(12) United States Patent
Gargiulo

(10) Patent No.: US 9,544,759 B2
(45) Date of Patent: Jan. 10, 2017

(54) SYSTEMS, METHODS, AND COMPUTER PROGRAM PRODUCTS FOR MANAGING STATES

(71) Applicant: GOOGLE INC., Mountain View, CA (US)

(72) Inventor: Michael J. Gargiulo, Corinth, TX (US)

(73) Assignee: GOOGLE INC., Mountain View, CA (US)

( * ) Notice: Subject to any disclaimer, the term of this patent is extended or adjusted under 35 U.S.C. 154(b) by 130 days.

(21) Appl. No.: 14/183,137

(22) Filed: Feb. 18, 2014

(65) Prior Publication Data

US 2014/0164475 A1 Jun. 12, 2014

Related U.S. Application Data

(63) Continuation-in-part of application No. 13/653,160, filed on Oct. 16, 2012, now Pat. No. 9,104,887.

(60) Provisional application No. 61/702,653, filed on Sep. 18, 2012, provisional application No. 61/825,867, filed on May 21, 2013, provisional application No. 61/554,393, filed on Nov. 1, 2011.

(51) Int. Cl.
*H04W 8/24* (2009.01)
*H04L 9/32* (2006.01)

(52) U.S. Cl.
CPC ............... *H04W 8/24* (2013.01); *H04L 9/32* (2013.01); *H04L 2209/56* (2013.01)

(58) Field of Classification Search
CPC .......... H04L 9/32; H04L 2209/56; H04W 8/24
USPC ............................................ 726/2, 3, 4, 5, 6
See application file for complete search history.

(56) References Cited

U.S. PATENT DOCUMENTS

| 5,221,838 A | 6/1993 | Gutman et al. |
| 5,590,038 A | 12/1996 | Pitroda ........................ 395/241 |
| 5,640,002 A | 6/1997 | Ruppert et al. ............... 235/472 |
| 5,748,740 A | 5/1998 | Curry et al. .................... 380/25 |
| 5,805,702 A | 9/1998 | Curry et al. .................... 380/24 |
| 5,883,810 A | 3/1999 | Rosen et al. |

(Continued)

FOREIGN PATENT DOCUMENTS

| CA | 2 381 614 A1 | 3/2001 |
| EP | 1 222 503 A2 | 7/2002 |

(Continued)

OTHER PUBLICATIONS

Int'l Search Report and Written Opinion issued in connection with Int'l Appl'n No. PCT/US2014/016922 on Jun. 24, 2014 (8 pages).

(Continued)

*Primary Examiner* — Brandon Hoffman
*Assistant Examiner* — Nega Woldemariam
(74) *Attorney, Agent, or Firm* — Johnson, Marcou & Isaacs, LLC

(57) ABSTRACT

System, methods, and computer program products are provided for managing mobile entity states. A first notification is received over a communications network, the first notification including data indicating that a first service associated with a mobile device has been suspended. State information stored in a memory is updated based on the data included in the first notification. A second notification is transmitted over a communications network, the second notification indicating that the state information has been updated.

20 Claims, 9 Drawing Sheets

(56) References Cited

U.S. PATENT DOCUMENTS

| | | | |
|---|---|---|---|
| 5,884,271 A | 3/1999 | Pitroda | 705/1 |
| 5,901,303 A | 5/1999 | Chew | 395/400 |
| 5,940,510 A | 8/1999 | Curry et al. | 380/25 |
| 5,949,880 A | 9/1999 | Curry et al. | 380/24 |
| 6,000,832 A | 12/1999 | Simon et al. | |
| 6,005,942 A | 12/1999 | Chan et al. | |
| 6,073,840 A | 6/2000 | Marion | 235/381 |
| 6,105,013 A | 8/2000 | Curry et al. | 705/65 |
| 6,116,505 A | 9/2000 | Withrow | 235/381 |
| 6,131,811 A | 10/2000 | Gangi | 235/380 |
| 6,148,192 A | 11/2000 | Ahvenainen | |
| 6,233,683 B1 | 5/2001 | Chan et al. | |
| 6,237,095 B1 | 5/2001 | Curry et al. | 713/178 |
| 6,422,464 B1 | 7/2002 | Terranova | 235/384 |
| 6,587,835 B1 | 7/2003 | Treyz et al. | 705/14 |
| 6,601,759 B2 | 8/2003 | Fife et al. | 235/375 |
| 6,671,358 B1 | 12/2003 | Seidman et al. | 379/93.12 |
| 6,732,081 B2 | 5/2004 | Nicholson | 705/14 |
| 6,769,607 B1 | 8/2004 | Pitroda et al. | 235/380 |
| 6,786,400 B1 | 9/2004 | Bucci et al. | |
| 6,813,609 B2 | 11/2004 | Wilson | 705/14 |
| 6,837,436 B2 | 1/2005 | Swartz et al. | 235/472.02 |
| 6,879,965 B2 | 4/2005 | Fung et al. | |
| 6,912,398 B1 | 6/2005 | Domnitz et al. | |
| 6,925,439 B1 | 8/2005 | Pitroda | 705/1 |
| 7,083,094 B2 | 8/2006 | Cooper | 235/449 |
| 7,110,792 B2 | 9/2006 | Rosenberg | 455/414 |
| 7,127,236 B2 | 10/2006 | Khan et al. | 455/414.1 |
| 7,155,405 B2 | 12/2006 | Petrovich | 705/26 |
| 7,194,422 B1 | 3/2007 | Killick | 705/14 |
| 7,216,109 B1 | 5/2007 | Donner | 705/64 |
| 7,249,112 B2 | 7/2007 | Berardi et al. | 705/79 |
| 7,286,818 B2 | 10/2007 | Rosenberg | 455/414.1 |
| 7,298,271 B2 | 11/2007 | Sprogis | 340/572.1 |
| 7,308,426 B1 | 12/2007 | Pitroda | 705/35 |
| 7,330,714 B2 | 2/2008 | Rosenberg | 455/412.1 |
| 7,349,885 B2 | 3/2008 | Gangi | 705/41 |
| 7,363,265 B2 | 4/2008 | Horgan et al. | |
| 7,401,731 B1 | 7/2008 | Seidel et al. | |
| 7,469,151 B2 | 12/2008 | Khan et al. | 455/558 |
| 7,469,381 B2 | 12/2008 | Ording | 715/702 |
| 7,483,858 B2 | 1/2009 | Foran et al. | 705/39 |
| 7,494,055 B2 | 2/2009 | Fernandes et al. | 235/380 |
| 7,529,563 B1 | 5/2009 | Pitroda | 455/558 |
| 7,571,139 B1 | 8/2009 | Giordano et al. | 705/40 |
| 7,581,678 B2 | 9/2009 | Narendra et al. | 235/451 |
| 7,613,628 B2 | 11/2009 | Ariff et al. | 705/14 |
| 7,631,810 B2 | 12/2009 | Liu et al. | 235/451 |
| 7,685,037 B2 | 3/2010 | Reiners et al. | |
| 7,693,752 B2 | 4/2010 | Jaramillo | 705/26 |
| 7,702,578 B2 | 4/2010 | Fung et al. | |
| 7,708,198 B2 | 5/2010 | Gangi | 235/380 |
| 7,712,658 B2 | 5/2010 | Gangi | 235/380 |
| 7,775,430 B2 | 8/2010 | Lin | 235/383 |
| 7,802,264 B2 | 9/2010 | Greene et al. | |
| 7,805,615 B2 | 9/2010 | Narendra et al. | 713/186 |
| 7,809,652 B2 | 10/2010 | Thaw et al. | |
| 7,818,727 B2 | 10/2010 | Wilkinson et al. | |
| 7,828,214 B2 | 11/2010 | Narendra et al. | 235/451 |
| 7,856,377 B2 | 12/2010 | Cohagan et al. | 705/14.3 |
| 7,864,163 B2 | 1/2011 | Ording et al. | 345/173 |
| 7,865,414 B2 | 1/2011 | Fung et al. | |
| 7,890,422 B1 | 2/2011 | Hirka et al. | |
| 7,922,083 B2 | 4/2011 | Harrison et al. | |
| 7,942,337 B2 | 5/2011 | Jain | 235/492 |
| 7,954,715 B2 | 6/2011 | Narendra et al. | 235/451 |
| 7,954,716 B2 | 6/2011 | Narendra et al. | 235/451 |
| 7,954,717 B2 | 6/2011 | Narendra et al. | 235/451 |
| 7,961,101 B2 | 6/2011 | Narendra et al. | 340/572.1 |
| 7,967,215 B2 | 6/2011 | Kumar et al. | 235/492 |
| 7,991,158 B2 | 8/2011 | Narendra et al. | 380/260 |
| 7,996,288 B1 | 8/2011 | Stolfo et al. | |
| 8,060,449 B1 | 11/2011 | Zhu et al. | |
| 8,069,121 B2 | 11/2011 | Goodrich et al. | |
| 8,072,331 B2 | 12/2011 | Narendra et al. | 340/572.1 |
| 8,083,145 B2 | 12/2011 | Narendra et al. | 235/451 |
| 8,091,786 B2 | 1/2012 | Narendra et al. | 235/451 |
| 8,131,645 B2 | 3/2012 | Lin et al. | 705/51 |
| 8,140,418 B1 | 3/2012 | Casey et al. | 705/35 |
| 8,171,525 B1 | 5/2012 | Pelly et al. | 726/2 |
| 8,196,131 B1 | 6/2012 | Von Behren et al. | |
| 8,326,758 B2 | 12/2012 | Bennett et al. | |
| 8,392,328 B2 | 3/2013 | Shah et al. | |
| 8,396,808 B2 | 3/2013 | Greenspan | 705/64 |
| 8,429,046 B2 | 4/2013 | Pitroda | 705/35 |
| 8,776,189 B2 | 7/2014 | Jain | |
| 8,875,228 B2 | 10/2014 | Gargiulo et al. | |
| 2002/0040936 A1 | 4/2002 | Wentker et al. | |
| 2002/0049631 A1 | 4/2002 | Williams | 705/14 |
| 2002/0082921 A1 | 6/2002 | Rankin | 705/14 |
| 2002/0152156 A1 | 10/2002 | Tyson-Quah et al. | |
| 2002/0174025 A1 | 11/2002 | Hind et al. | 705/26 |
| 2002/0179703 A1 | 12/2002 | Allen | 235/381 |
| 2003/0009382 A1 | 1/2003 | D'Arbeloff et al. | 705/17 |
| 2003/0061157 A1 | 3/2003 | Hirka et al. | |
| 2003/0083042 A1 | 5/2003 | Abuhamdeh | 455/406 |
| 2003/0115126 A1 | 6/2003 | Pitroda | 705/36 |
| 2003/0126094 A1 | 7/2003 | Fisher et al. | |
| 2003/0132298 A1 | 7/2003 | Swartz et al. | 235/472.02 |
| 2003/0200489 A1 | 10/2003 | Hars | 714/703 |
| 2004/0024703 A1 | 2/2004 | Roskind et al. | |
| 2004/0073519 A1 | 4/2004 | Fast | 705/65 |
| 2004/0148255 A1 | 7/2004 | Beck et al. | |
| 2004/0166839 A1 | 8/2004 | Okkonen et al. | |
| 2004/0186768 A1 | 9/2004 | Wakim et al. | 705/14 |
| 2005/0004866 A1 | 1/2005 | Bonalle et al. | 705/39 |
| 2005/0171898 A1 | 8/2005 | Bishop et al. | 705/39 |
| 2005/0186954 A1 | 8/2005 | Kenney et al. | |
| 2005/0191968 A1 | 9/2005 | Tabayashi et al. | |
| 2005/0199714 A1 | 9/2005 | Brandt et al. | |
| 2005/0222961 A1 | 10/2005 | Staib et al. | 705/64 |
| 2005/0234769 A1 | 10/2005 | Jain et al. | 705/14 |
| 2005/0247777 A1 | 11/2005 | Pitroda | 235/380 |
| 2005/0251446 A1 | 11/2005 | Jiang et al. | |
| 2006/0149665 A1 | 7/2006 | Weksler et al. | |
| 2006/0178937 A1 | 8/2006 | Rau et al. | |
| 2006/0287004 A1 | 12/2006 | Fuqua | 455/558 |
| 2007/0014407 A1 | 1/2007 | Narendra et al. | 380/259 |
| 2007/0014408 A1 | 1/2007 | Narendra et al. | 380/270 |
| 2007/0095892 A1 | 5/2007 | Lyons et al. | |
| 2007/0170247 A1 | 7/2007 | Friedman et al. | |
| 2007/0198432 A1 | 8/2007 | Pitroda et al. | 705/64 |
| 2007/0265961 A1 | 11/2007 | Shah et al. | |
| 2008/0015988 A1 | 1/2008 | Brown et al. | |
| 2008/0306849 A1 | 12/2008 | Johnson, Jr. et al. | 705/35 |
| 2008/0319887 A1 | 12/2008 | Pizzi et al. | |
| 2009/0037333 A1 | 2/2009 | Flitcroft et al. | |
| 2009/0098854 A1 | 4/2009 | Park et al. | |
| 2009/0108064 A1 | 4/2009 | Fernandes et al. | 235/380 |
| 2009/0149192 A1 | 6/2009 | Vargas et al. | |
| 2009/0164322 A1 | 6/2009 | Khan et al. | 705/14 |
| 2009/0172678 A1 | 7/2009 | Branca et al. | |
| 2009/0192935 A1 | 7/2009 | Griffin et al. | |
| 2009/0240620 A1 | 9/2009 | Kendrick et al. | |
| 2009/0313143 A1 | 12/2009 | Darensbourg et al. | |
| 2010/0036770 A1 | 2/2010 | Fourez et al. | |
| 2010/0070649 A1 | 3/2010 | Ng et al. | |
| 2010/0082481 A1 | 4/2010 | Lin et al. | |
| 2010/0094753 A1 | 4/2010 | Carlson et al. | |
| 2010/0114739 A1 | 5/2010 | Johnston et al. | |
| 2010/0138518 A1 | 6/2010 | Aiglstorfer et al. | |
| 2010/0174595 A1 | 7/2010 | Aaltonen et al. | |
| 2010/0188975 A1* | 7/2010 | Raleigh | G06Q 10/06375 370/230.1 |
| 2010/0198728 A1 | 8/2010 | Aabye et al. | |
| 2010/0211445 A1 | 8/2010 | Bodington | |
| 2010/0241494 A1 | 9/2010 | Kumar et al. | 705/14.1 |
| 2010/0257040 A1 | 10/2010 | Hunt et al. | |
| 2010/0291904 A1 | 11/2010 | Musfeldt et al. | |
| 2010/0312636 A1 | 12/2010 | Coulter et al. | |
| 2011/0006113 A1 | 1/2011 | Uchikura et al. | |
| 2011/0029786 A1 | 2/2011 | Raffard et al. | |
| 2011/0055047 A1 | 3/2011 | Fox et al. | |
| 2011/0073663 A1 | 3/2011 | Narendra et al. | 235/492 |

(56) References Cited

U.S. PATENT DOCUMENTS

| | | |
|---|---|---|
| 2011/0087610 A1 | 4/2011 | Batada et al. |
| 2011/0127324 A1 | 6/2011 | Hirka et al. |
| 2011/0131133 A1 | 6/2011 | Hirka et al. |
| 2011/0145152 A1 | 6/2011 | McCown et al. |
| 2011/0161188 A1 | 6/2011 | Roberts et al. |
| 2011/0171996 A1 | 7/2011 | Narendra et al. ............ 455/558 |
| 2011/0180598 A1 | 7/2011 | Morgan et al. |
| 2011/0191149 A1 | 8/2011 | Blackhurst et al. |
| 2011/0218849 A1 | 9/2011 | Rutigliano et al. |
| 2011/0223972 A1 | 9/2011 | Narendra et al. ............ 455/558 |
| 2011/0231238 A1 | 9/2011 | Khan et al. ................ 705/14.26 |
| 2011/0238510 A1 | 9/2011 | Rowen et al. |
| 2011/0244796 A1 | 10/2011 | Khan et al. .................. 455/41.1 |
| 2011/0269438 A1 | 11/2011 | Narendra et al. ......... 455/414.1 |
| 2011/0271044 A1 | 11/2011 | Narendra et al. ............ 711/103 |
| 2011/0272468 A1 | 11/2011 | Narendra et al. ............ 235/492 |
| 2011/0272469 A1 | 11/2011 | Narendra et al. ............ 235/492 |
| 2011/0282780 A1 | 11/2011 | French et al. |
| 2011/0289001 A1 | 11/2011 | Bishop et al. |
| 2011/0320345 A1 | 12/2011 | Taveau et al. |
| 2012/0047237 A1 | 2/2012 | Arvidsson et al. |
| 2012/0064828 A1 | 3/2012 | Khan et al. .................. 455/41.1 |
| 2012/0089520 A1 | 4/2012 | Mardikar ........................ 705/71 |
| 2012/0109681 A1 | 5/2012 | Chapman et al. |
| 2012/0109764 A1 | 5/2012 | Martin et al. .................. 705/17 |
| 2012/0171992 A1 | 7/2012 | Cheong et al. ............... 455/410 |
| 2012/0197773 A1 | 8/2012 | Grigg et al. |
| 2012/0231736 A1 | 9/2012 | Amiel et al. |
| 2012/0259768 A1 | 10/2012 | Mukherjee et al. |
| 2012/0267432 A1 | 10/2012 | Kuttuva et al. |
| 2012/0304255 A1 | 11/2012 | Carnes ............................ 726/3 |
| 2012/0323664 A1 | 12/2012 | Klems ........................ 705/14.26 |
| 2013/0024289 A1 | 1/2013 | Cueli et al. |
| 2013/0060618 A1 | 3/2013 | Barton et al. |
| 2013/0080227 A1 | 3/2013 | Maskatia et al. |
| 2013/0111599 A1 | 5/2013 | Gargiulo ........................ 726/26 |
| 2014/0040126 A1 | 2/2014 | Andrews et al. |
| 2014/0082056 A1 | 3/2014 | Gargiulo et al. |
| 2015/0007345 A1 | 1/2015 | Gargiulo et al. |
| 2015/0310223 A1 | 10/2015 | Gargiulo |

FOREIGN PATENT DOCUMENTS

| | | |
|---|---|---|
| EP | 1153375 B1 | 1/2003 |
| EP | 0 766 852 B1 | 8/2004 |
| EP | 1 412 890 A4 | 11/2004 |
| EP | 1 477 943 A2 | 11/2004 |
| EP | 2043060 A1 | 4/2009 |
| EP | 2048591 A1 | 4/2009 |
| EP | 2306684 A1 | 4/2011 |
| JP | 2004102784 A | 4/2004 |
| JP | 2007288494 A | 11/2007 |
| JP | 2010534879 A | 11/2010 |
| KR | 1020080096722 A | 11/2008 |
| KR | 1020120046376 A | 5/2012 |
| WO | WO 01/18629 A3 | 3/2001 |
| WO | WO 03/012717 A1 | 2/2003 |
| WO | 2009013700 A2 | 1/2009 |
| WO | 2009144612 A1 | 12/2009 |
| WO | 2010050652 A1 | 5/2010 |
| WO | 2010120222 A1 | 10/2010 |
| WO | 2012042262 A1 | 4/2012 |
| WO | 2013066620 A1 | 5/2013 |
| WO | 2013066621 A1 | 5/2013 |
| WO | 2014022383 A1 | 2/2014 |
| WO | 2014047069 A1 | 3/2014 |

OTHER PUBLICATIONS

U.S. Appl. No. 13/731,090 to Andrews et al. filed Dec. 30, 2012.
Aconyte Smart Solutions, "Mobile Application Management", May 1, 2012, XP055050399, 6 pages.
Bai, "International Preliminary Report on Patentability issued in International Application No. PCT/US2013/052708", mailed on Feb. 12, 2015, 7 pages.
Campen, "U.S. Office Action issued in copending U.S. Appl. No. 13/545,702, filed Jul. 10, 2012", mailed Jun. 17, 2013, 14 pages.
Colbert, "Office Action issued in copending U.S. Appl. No. 13/759,003, filed Feb. 4, 2013", mailed Jun. 6, 2013, 24 pages.
Finextra Research, "Aconite launches Mobile Application Management", Oct. 26, 2011, XP055050391, 2 pages.
Gee, "U.S. Office Action issued in copending U.S. Appl. No. 14/487,433, filed Sep. 16, 2014, mailed on Aug. 17, 2015", 19 pages.
Gee, "U.S. Office Action issued in copending U.S. Appl. No. 14/487,433, filed Sep. 16, 2014, mailed on May 8, 2015", 14 pages.
Global Platform Inc., "Global Platform—Card Specification," Global Platform Inc., version 2.1.1, Mar. 2003, pp. 1-237.
Global Platform Inc., "Global Platform's Proposition for NFC Mobile: Secure Element Management and Messaging", GlobalPiatform Inc., Apr. 2009, pp. 1-36.
Globalplatform Inc., "GiobalPlatform Card Contactless Services Card Specification v2.2—Amendment C," GlobalPlatform Inc., version 1.0., Feb. 2010, pp. 1-77.
Globalplatform Inc., "GlobalPlatform—Card Specification," GlobalPlatform Inc., version 2.2, Mar. 2006, pp. 1-375.
Johnson, "Office Action issued in copending U.S. Appl. No. 13/717,295, filed Dec. 17, 2012", mailed Feb. 28, 2013, 13 pages.
Kim, "International Search Report and Written Opinion issued in International Application No. PCT/US2013/052708", mailed on Nov. 19, 2013, 10 pages.
Kim, "Korean Office Action issued in Korean Application No. 10-2014-7014377 mailed on Sep. 24, 2014", 3 pages of English Translation and 3 pages of Korean Office Action.
Lau, "Canada Office Action issued in Canada Application No. 2854276 mailed on Aug. 26, 2015", 4 pages.
Lau, "Canada Office Action issued in Canada Application No. 2854277 mailed on Nov. 21, 2014", 5 pages.
Lee, "Korean Office Action issued in Korean Application No. 102014-7035460, mailed on Jul. 30, 2015", 6 pages of Korean Office Action only.
Louie, "U.S. Office Action issued in copending U.S. Appl. No. 13/653,145, filed Oct. 16, 2012, mailed on Jun. 17, 2013", 7 pages.
Louie, "U.S. Office Action issued in copending U.S. Appl. No. 13/653,145, filed Oct. 16, 2012, mailed on May 2, 2014", 9 pages.
Louie, "U.S. Office Action issued in copending U.S. Appl. No. 13/653,145, filed Oct. 16, 2012, mailed on Oct. 25, 2013", 8 pages.
McCosker, "Australian Office Action issued in Australian Application No. 2012332956 mailed on Apr. 20, 2015", 3 pages.
MX/A/2014/005180, "Office Action received for Mexican Patent Application No. MX/a/2014/005180, mailed on Jul. 10, 2015," 2 pages.
Nakazato, "Japanese Office Action issued in Japanese Application No. 2014-538837 mailed on Apr. 27, 2015", 12 pages of English Translation and 11 pages of Japanese Office Action.
Nakazato, "Japanese Office Action issued in Japanese Application No. 2014-538837 mailed on Oct. 5, 2015", 6 pages of English Translation and 6 pages of Japanese Office Action.
Nega, "U.S. Office Action issued in copending U.S. Appl. No. 13/653,160, filed Oct. 16, 2012, mailed on Oct. 21, 2014", 10 pages.
Ng, "Australian Office Action issued in Australian Application No. 2015234304 mailed on Nov. 17, 2015", 3 pages.
Nguyen, "Office Action issued in copending U.S. Appl. No. 13/784,808, filed Mar. 4, 2013", mailed Jul. 15, 2013, 20 pages.
Nora, "International Preliminary Report on Patentability issued in International Application No. PCT/US2014/016922", mailed on Dec. 3, 2015, 7 pages.
Omogbenigun, "Australian Office Action issued in Australian Application No. 2013318245 mailed on Jul. 8, 2015", 3 pages.
Omogbenigun, "Australian Office Action issued in Australian Application No. 2013318245 mailed on Aug. 14, 2015", 3 pages.
PCT/US2012/060442, "International Preliminary Report on Patentability and Written Opinion Received for PCT Patent Application No. PCT/US2012/060442, mailed on May 15, 2014," 18 pages.

(56) References Cited

OTHER PUBLICATIONS

PCT/US2012/060442, "International Search Report and Written Opinion received for PCT Patent Application No. PCT/ US2012/060442, mailed on Jan. 28, 2013," 11 pages.
PCT/US2012/060445, "International Preliminary Report on Patentability and Written Opinion Received for PCT Patent Application No. PCT/US2012/060445, mailed on May 15, 2014," 14 pages.
PCT/US2012/060445, "International Search Report and Written Opinion received for PCT Patent Application No. PCT/ US2012/060445, mailed on Jan. 28, 2013," 10 pages.
PCT/US2013/028697, "International Search Report and Written Opinion of the International Searching Authority for International Pat. Application No. PCT/US2013/028697, May 23, 2013," 8 pages.
PCT/US2013/033467, "International Search Report and Written Opinion of the International Searching Authority for International Patent Application No. PCT/US2013/033467, Jul. 4, 2013," 8 pages.
PCT/US2013/035406, "International Search Report and Written Opinion of the International Searching Authority for International Patent Application No. PCT/US2013/035406, Jul. 19, 2013," 8 pages.
PCT/US2013/060189, "International Preliminary Report on Patentability and Written Opinion Received for PCT Patent Application No. PCT/US2013/060189, mailed on Apr. 2, 2015," 14 pages.
PCT/US2013/060189, "International Search Report and Written Opinion received for PCT Patent Application No. PCT/US2013/060189, mailed on Nov. 22, 2013," 9 pages.
Quittner, "PayPal Seeks to Cut Out Card Companies with New Plastic", PayPal inc., Published in Bank Technology News, Oct. 18, 2011, 2 pages.
Shaikh, "Office Action issued in copending U.S. Appl. No. 13/802,705, filed Mar. 13, 2013", mailed Jul. 18, 2013, 11 pages.
Shingles, "U.S. Office Action issued in copending U.S. Appl. No. 14/029,463, filed Sep. 17, 2013", mailed Dec. 3, 2015, 8 pages.
Trotter, "U.S. Office Action issued in copending U.S. Appl. No. 13/731,090, filed Dec. 30, 2012", mailed Nov. 3, 2015, 14 pages.
Trotter, "U.S. Office Action issued in copending U.S. Appl. No. 13/731,090, filed Dec. 30, 2012", mailed Apr. 3, 2015, 15 pages.
Weidmann, "Extended European Search Report issued in European Application No. 13825094.9", mailed on Dec. 9, 2015, 8 pages.
Wikipedia, "Disbarment", From Wikipedia, the free encyclopedia, Dec. 24, 2010, 4 pages.
Yliuntinen, "3rd Party TSM Management of SIM Cards," [online], Sep. 12, 2011, 4 pages.
Ziegle, "Office Action issued in copending U.S. Appl. No. 13/658,783, filed Oct. 23, 2012", mailed Mar. 5, 2013, 14 pages.
Ziegle, "Office Action issued in copending U.S. Appl. No. 13/658,783, filed Oct. 23, 2012", mailed Jul. 11, 2013, 17 pages.

\* cited by examiner

160

| Customer Reference Identifier | Secure Element Identifier | Mobile Subscription Identifier | Mobile Device Number | ... | Mobile Subscription State | Mobile Wallet State | ... |
|---|---|---|---|---|---|---|---|
| X-1 | 123438 | XXKA882 | 202-555-1111 | | ACTIVATED | ACTIVATED | |
| X-2 | 12452342 | ANQO435 | 703-555-2222 | | SUSPENDED | ACTIVATED | |
| X-3 | 542223 | XYZU8293 | 202-555-2613 | | RESTRICTED | ACTIVATED | |
| X-4 | 927473 | UWKC848 | 202-555-2396 | | SUSPENDED | SUSPENDED | |
| ... | | | | | | | |

FIG. 1B

SYSTEMS, METHODS, AND COMPUTER PROGRAM PRODUCTS FOR MANAGING STATES

CROSS REFERENCE TO RELATED APPLICATIONS

This application is a continuation-in-part of U.S. patent application Ser. No. 13/653,160, filed Oct. 16, 2012, which claims priority to U.S. Provisional Application Nos. 61/702,653, filed Sep. 18, 2012, and 61/554,393, filed Nov. 1, 2011 the contents of which are incorporated herein by reference. This application also claims priority to U.S. Provisional Application No. 61/825,867, filed May 21, 2013, the contents of which are incorporated herein by reference.

BACKGROUND

Field

The present invention relates to managing states, and more particularly to systems, methods, and computer program products for managing states relating to mobile commerce transactions, including mobile subscription states and/or mobile wallet states.

Related Art

A service provider (SP) is a company, organization, entity, or the like, that provides services to customers or consumers. Examples of service providers include account-issuing entities such as merchants, card associations, banks, marketing companies, and transit authorities. A service may be an activity, capability, functionality, work, or use that is permitted or provided by a service provider such as a payment service, a gift, offer or loyalty service, transit pass service, and the like.

In a mobile environment that involves contactless transactions between a mobile device and a service provider, information relating to the accounts and applications issued by the service providers are downloaded onto mobile devices in order to enable them to perform the contactless transactions.

A trusted service manager (TSM) is typically an independent entity serving mobile network operators (MNOs) and account-issuing service providers by provisioning applications, such as contactless applications associated with the service providers, to mobile devices. Typical TSMs can distribute and manage the contactless applications remotely because they have access to secure elements (SEs) in a near field communication (NFC) enabled mobile device.

A central TSM typically performs the functions of configuring the mobile device and/or the secure element, such as the provisioning of applications or the updating of data stored on the mobile device or the secure element. The central TSM usually communicates with the mobile device across a mobile network that provides network connectivity to the mobile device. That is, a mobile device generally subscribes to a particular MNO, and the MNO manages the network connectivity of the mobile device while the mobile subscription is maintained. The network connection across the MNO associated with the mobile device is generally known as a mobile line.

However, if a mobile subscription associated with the mobile device is not active, the central TSM may be unable to perform various functions such as provisioning and updating operations, as data transmitted by the central TSM cannot be received by the mobile device. A mobile subscription may be inactive due to, for instance, suspension by the MNO upon reporting of a lost or stolen mobile device.

Typically, after initially failing to connect with the mobile device due to an inactive mobile subscription, the central TSM may again attempt to connect with the mobile device at periodic intervals, despite the mobile subscription remaining inactive. These unsuccessful attempts result in wasted expenditure of computing and network resources by the central TSM.

In addition, a customer may wish to temporarily suspend service provider services associated with a mobile device, which may require information updates on multiple components such as the mobile device, the central TSM, and service providers.

As such, one technical challenge involves ensuring the proper storage and management of states, to reduce the unnecessary expenditure of resources.

BRIEF DESCRIPTION

The present invention provides systems, methods, and computer program products for managing states relating to mobile commerce transactions, including mobile subscription states and/or mobile wallet states.

In one embodiment, a system includes at least one memory and at least one processor coupled to the at least one memory. The at least one processor is operable to receive, over a communications network, a first notification including data indicating that a first service associated with a mobile device has been suspended, update state information stored in said at least one memory based on the data included in the first notification, and transmit, over a communications network, a second notification that the state information has been updated.

In another embodiment, a method is executed on a first system including at least one processor and at least one memory. A first notification is received with the at least one processor over a communications network, the first notification including data indicating that a first service associated with a mobile device has been suspended. State information stored in the at least one memory is updated with the at least one processor based on the data included in the first notification. A second notification that the state information has been updated is transmitted with the at least one processor over a communications network.

In another embodiment, a non-transitory computer-readable medium has stored thereon instructions which, when executed by a system including at least one processor and at least one memory, cause the system to perform the steps of: receiving, with the at least one processor over a communications network, a first notification including data indicating that a first service associated with a mobile device has been suspended; updating, with the at least one processor, state information stored in the at least one memory based on the data included in the first notification; and transmitting, with the at least one processor over a communications network, a second notification that the state information has been updated.

Further features and advantages of the present invention will become more apparent from the detailed description set forth below when taken in conjunction with the following drawings.

BRIEF DESCRIPTION OF THE DRAWINGS

The features and advantages of the present invention will become more apparent from the detailed description set forth below when taken in conjunction with the following drawings.

FIG. 1B is a table showing information stored within a memory of a central trusted service manager according to an exemplary embodiment.

DETAILED DESCRIPTION

Overview

The example embodiments of the invention presented herein are directed to systems, methods, and computer program products for managing states. This is for convenience only, and is not intended to limit the application of the present invention. In fact, after reading the following description, it will be apparent to one skilled in the relevant art(s) how to implement the following invention in alternative embodiments, such as the management of a variety of states in a mobile commerce environment.

Generally, the exemplary embodiments described herein perform management of states, including mobile subscription states and/or mobile wallet states.

I. System

Figure 1A:
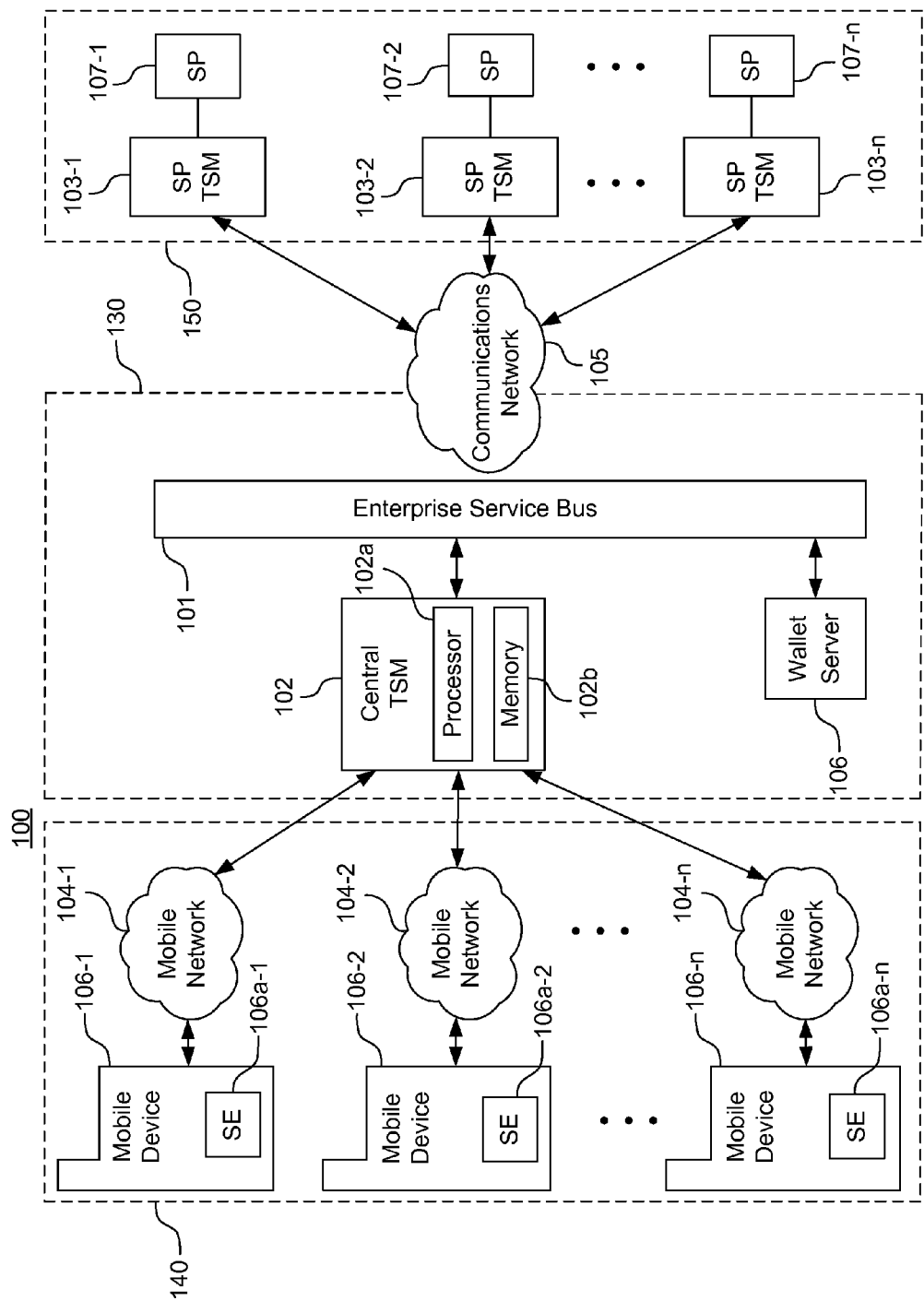
FIG. 1A is a diagram of a system for managing mobile entity states according to an exemplary embodiment.

FIG. 1 is a diagram of an exemplary system 100 in accordance with an example embodiment of the invention. As shown in FIG. 1, system 100 includes a central sub-system 130, a mobile network sub-system 140, and a service provider sub-system 150. The central sub-system 130 includes an enterprise service bus (ESB) 110, a central trusted service manager (central TSM) 102, and a wallet server 108. The mobile network sub-system 140 includes mobile devices 106-1, 106-2, . . . , 106-n (collectively "106") and mobile networks 104-1, 104-2, . . . , 104-n (collectively "104"). The service provider sub-system 150 includes service providers (SPs) 107-1, 107-2, . . . , 107-n (collectively "107") and service provider trusted services managers (SP TSMs) 103-1, 103-2, . . . , 103-n (collectively "103").

A. Mobile Network Sub-System 140

As shown in FIG. 1, each of the mobile devices 106 are respectively coupled to the central sub-system 140, and in particular the central TSM 102, via a respective mobile network 104. The mobile networks 104 are used and managed by MNOs to provide wireless communications services. The mobile networks 104 may be mobile phone cellular networks, radio networks, or the like. Each MNO may control the access and restriction of data across a mobile network, and may itself communicate with the central TSM 102.

Mobile devices 106-1, 106-2, and 106-n are associated with secure elements 106a, 106a-2, . . . , 106a-n (collectively "106a"), respectively. The secure elements 106a may be communicatively coupled to one or more processors and one or more memories. A secure element 106a permits identification and authentication of a customer associated with the secure element 106a and the mobile device 106, such that the customer may conduct a transaction with a service provider 107 via the secure element 106a. Examples of such transactions include a payment service, a gift, offer or loyalty service, transit pass service, and the like. The secure element 106a may be implemented as hardware, software, or a combination of hardware or software. In one embodiment, the secure element 106a is implemented as a combination of hardware and software, embodied in one or more of a universal integrated circuit card (UICC) (e.g., SIM card), removable data storage (e.g., microSD card), or circuitry integrated within the hardware of the respective mobile device 106. The secure element 106a may also be capable of performing NFC transactions and may wirelessly communicate with an NFC terminal.

During manufacture of a secure element (e.g., secure element 106a-1), the secure element is pre-loaded with content including, for example, a wallet companion applet, a mobile wallet companion applet (WCAp), a proximity payment system environment (PPSE), and a payment package. The WCAp may be used by a mobile wallet in order to conduct transactions, and the PPSE is an application that assists in the process of making contactless payment transactions. The secure element may also include various partitions or security domains (SDs) such as an MNO SD and a central SD. The MNO SD is a security domain that is managed by an MNO, and includes security keys and applications. The central SD is managed by the central TSM 102.

The secure elements 106a may include security domains, code, applets, applications, and packages. The packages may include uninstantiated applets and/or applications, and may be loaded on a secure element, for example, over-the-air (OTA). Applets and/or applications on the secure element may be in uninstantiated or instantiated form, and uninstantiated applets and/or applications may be preloaded on a secure element during manufacture of the secure element. Alternatively, applets and/or applications may be loaded, for example, OTA after a secure element has been manufactured (e.g., upon delivering the secure element to a user). Applets and/or applications may be generic or non-generic. Non-generic applets and/or applications may include couponing and loyalty applications, and/or any application that is not generic to multiple service providers. That is, a non-generic application may correspond to a single service provider. Data that may be used and/or associated with a non-generic application (e.g., offers, coupons) may be stored in the secure element or in memory outside of the secure element (e.g., non-volatile memory of a mobile device).

Generic applets and/or applications may include applets and/or applications that, when instantiated, can be used by multiple service providers. For example, a generic application of a payment network (e.g., MasterCard®) may be instantiated for multiple service providers by a central TSM, and therefore may be used by more than one service provider.

Packages including uninstantiated and/or generic applets and/or applications may be owned or controlled by a single entity controlling a central TSM and/or a central SD. Uninstantiated and/or generic applets and/or applications may be created under (i.e., directly associated with) a central SD on a secure element, and may be exclusively managed on the secure element by the central TSM using the central SD. In particular, the central SD maintains exclusive access to the WCAp, PPSE, packages, and SP SDs. However, service providers may transmit requests to the central TSM, for example, to rotate (i.e., exchange) security keys. After security keys of an SP SD have been rotated, the corresponding service provider can continue to send requests to the central TSM to execute commands on the corresponding SP SD. After key rotation, the central TSM has limited access to the SP SD. In particular, the central TSM can, for example, stop execution of an application or instantiate applications under the SP SD, but may not access the security keys or personalized content of the SP SD.

Exclusive ownership, control, and/or management of uninstantiated applets or applications allows a single entity to efficiently and cost effectively supervise the applets and/or applications. Further, exclusive ownership, control, and/or management increases security and minimizes the complexities caused by multiple service providers loading and controlling different applets and/or applications on a secure element. For example, a service provider may utilize an instance of an uninstantiated applet and/or application instead of certifying and installing an independent applet and/or application on the secure element.

Additionally, uninstantiated applets and/or applications may be instantiated, and each instance may then be extradited to a corresponding security domain. Instantiation may include personalizing applets and/or applications using data corresponding to the entity for which the instance is being created.

For example, multiple instances of an uninstantiated applet or application may be created for different entities (e.g., service providers) and each instance may be extradited to a different security domain for use by a different entity.

An applet or application on a secure element may function pursuant to requirements established by Global Platform, Europay, MasterCard®, Visa® (EMVCo.), MNOs, and payment networks (e.g., MasterCard®, Visa®, Discover®, American Express®). Applets or applications may be, for example, Expresspay™ payWave™, PayPass™, Zip™, and the like.

B. Central Sub-System 130

As shown in FIG. 1, each of the SP TSMs 103 are communicatively coupled to the ESB 101 via a communications network 105. Communications network 105 may be a virtual private network (VPN), a network using Hypertext Transfer Protocol (HTTP) standards, or the like. In turn, the ESB 101 is communicatively coupled to the central TSM 102 and a wallet server 106. These connections may be implemented as wired or wireless LAN connections, VPN connections, or any other network configuration, and may be secured using security protocols such as Secure Socket Layer (SSL), Transport Layer Security (TLS), or the like. In an exemplary embodiment, the ESB is an architecture model for implementing the interactions and communications between entities (e.g., secure elements 106a, SP TSMs 103, central TSM 102).

In an exemplary embodiment, the central TSM 102 is hardware and/or software that is implemented to serve as an intermediary between the SP TSMs 103 and secure elements 106a. Specifically, the central TSM 102 allows each of the SP TSMs 103 to, for example, request pre-personalization of a secure element 106a, generate and install new or temporary security domain keysets, personalize a payment service, and/or have a service activated. That is, the central TSM 102 manages the communications between the SP TSMs 103 and the secure elements 106a.

In an example embodiment, the central TSM 102 includes a processor 102a and a memory 102b.

The central TSM 102 is communicatively coupled to the secure elements 106a via corresponding mobile networks 104 used and/or managed by corresponding MNOs. The central TSM 102 may communicate with the secure elements 106a, via the mobile networks 104, using security protocols such as Global Platform secure channel protocol, SSL, TLS, or the like.

In an alternative embodiment, the central TSM 102 can directly perform operations without requiring an ESB as an intermediary. In such an embodiment, it will be understood that any discussions herein referring to an ESB should instead refer to the central TSM 102, and discussions herein referring to a communication between an ESB and a central TSM would be understood to be redundant or be otherwise communicated or transferred internally within the central TSM 102.

In one exemplary embodiment, the wallet server 106 is hardware and/or software that is implemented to perform mobile wallet functions and facilitate transactions between a secure element 106a and a service provider 107. In particular, the wallet server 106 is a remote server allowing managing remotely a wallet client on a secure element 106a. The wallet server 106 may modify the content of the wallet client on the secure element 106a and install new modules (known as "widgets") in relation with the services (e.g., NFC services) installed on the secure element 106a.

C. Service Provider Sub-System 150

As shown in FIG. 1, each of the SP TSMs 103 corresponds to a service provider 107 (also generally known as an "issuer"). Each SP TSM 103 serves as an intermediary between the service providers 107 and other entities including secure elements 106a, MNOs, and the central TSM 102.

As previously mentioned, each of the SP TSMs 103 is communicatively coupled to the ESB 101 via a communications network 105. Using this connection, an SP TSM 103 is thus communicatively coupled, via the communications network 105 and the ESB 101, to the central TSM 102.

Each of the SP TSMs 103 and the ESB 101 may also secure these communications by using security protocols such as SSL, TLS, or the like. Each of the SP TSMs 103 may also communicate with the ESB 101 and the central TSM 102 by using an application programming interface (API) such as a web service API.

The central TSM 102, therefore, can communicate with a plurality of service providers 107 and SP TSMs 103, and with a plurality of secure elements 106a over the plurality of mobile networks 104.

For example, the SP TSM 103-1 sends a request to the central TSM 102 via the communications network 105, and the central TSM 102 sends a response back to the SP TSM 103-1 via the communications network 105. The SP TSM 103-1 sends a request, intended for the secure element 106a-1, to the central TSM 102 via the communications network 105. In turn, the central TSM 102 sends that request to the secure element 106a-1 via the respective mobile network 104-1.

In an alternative embodiment, a plurality of service providers share one of the SP TSMs 103.

In an additional alternative embodiment, the memory 102b may be a database.

In another alternative embodiment, a plurality of mobile networks communicate with a plurality of SP TSMs.

A service provider 107 may communicate with the central TSM 102 in order to access or control a corresponding security domain and/or application on a secure element 106a. In particular, the service provider 107, by communicating with the central TSM 102, may pre-personalize a secure element 106a, personalize a service on a security domain in a secure element 106a, or activate a service on the secure element 106a. For example, the service provider 107 may transmit a request to the central TSM 102 to pre-personalize a secure element 106a. In response, the central TSM 102 may pre-personalize the secure element 106a, including creating at least one service provider security domain including corresponding temporary security keys, if required, and/or instantiating an application on the secure element 106a. Instantiation of the application includes creating an instance of an uninstantiated application.

The service provider 107 may also transmit a request to personalize a service to the central TSM 102. The request may include data and scripts. The scripts may include commands to be executed by an application on a security domain corresponding to the service provider 107 in the secure element 106a. For example, the scripts may include commands to personalize an instantiated application, rotate keys in the corresponding security domain, and/or execute service provider commands in the service provider's security domain and/or instantiated application in the secure element 106a. The central TSM 102 receives the request and securely transmits the scripts and/or data in the request to the secure element. In turn, the secure element 106a receives and executes the scripts and data.

II. Mobile Subscription States

In an example embodiment of the invention, the memory 102b of the central TSM 102 stores information relating to mobile subscription states. A mobile subscription state indicates a condition of a subscription of a mobile device to an MNO, the condition impacting whether a secure element 106a of a corresponding mobile device 106 successfully communicates with the central TSM 102. That is, since the central TSM 102 may rely on the mobile network 104 to communicate with a secure element 106a, a disruption within the mobile network 104 may affect the reception of such communications. A disruption may be network-wide within a mobile network 104, or may be specific to a particular mobile subscription associated with a specific mobile device 106. Embodiments herein will be described with respect to the latter type of disruption, in a circumstance where a particular mobile subscription is intentionally deactivated by the MNO. As will be described, this may occur for a number of reasons, such as, for instance, a lost or stolen mobile device 106 being reported. However, it will be appreciated that the example embodiment of the invention is similarly applicable towards the circumstance of a network-wide disruption within a mobile network 104 (e.g., network outage).

FIG. 1B depicts an example of a database 160 stored within the memory 102b of the central TSM 102. While the database is depicted in a table format for illustrative purposes, it will be appreciated that the information can be stored according to any data structure and format capable of such storage.

Database 160 contains a number of entries 162-1, 162-2, . . . , 162-n (collectively "162"), each storing fields of information 161-1, 161-2, . . . , 161-n (collectively "161"). The fields of information 161 may include a customer reference identifier 161-1, a corresponding secure element identifier 161-2, a corresponding mobile subscription identifier 161-3, a mobile device number 161-4, a mobile subscription state 161-i, a mobile wallet state 161-j, in addition to any other corresponding information 161-n. The customer reference identifier 161-1 identifies a customer operating a mobile device and conducting transactions within system 100; the secure element identifier 161-2 identifies a specific secure element associated with the mobile device of a customer, the mobile subscription identifier 161-3 identifies a mobile subscription associated with the mobile device of a customer; and the mobile device number 161-4 identifies the telephone number of the mobile device.

The mobile subscription state 161-i identifies a state of the mobile subscription corresponding to the mobile device associated with the customer. The potential mobile subscription states may include at least "ACTIVATED", "RESTRICTED", "SUSPENDED", and "TERMINATED", as discussed in greater detail below, but may also include other states.

The mobile wallet state 161-j identifies a state of a mobile wallet used for conducting transactions within the system 100. The potential mobile wallet states may include at least "ACTIVATED" and "SUSPENDED", but may also include other states.

Figure 1C:
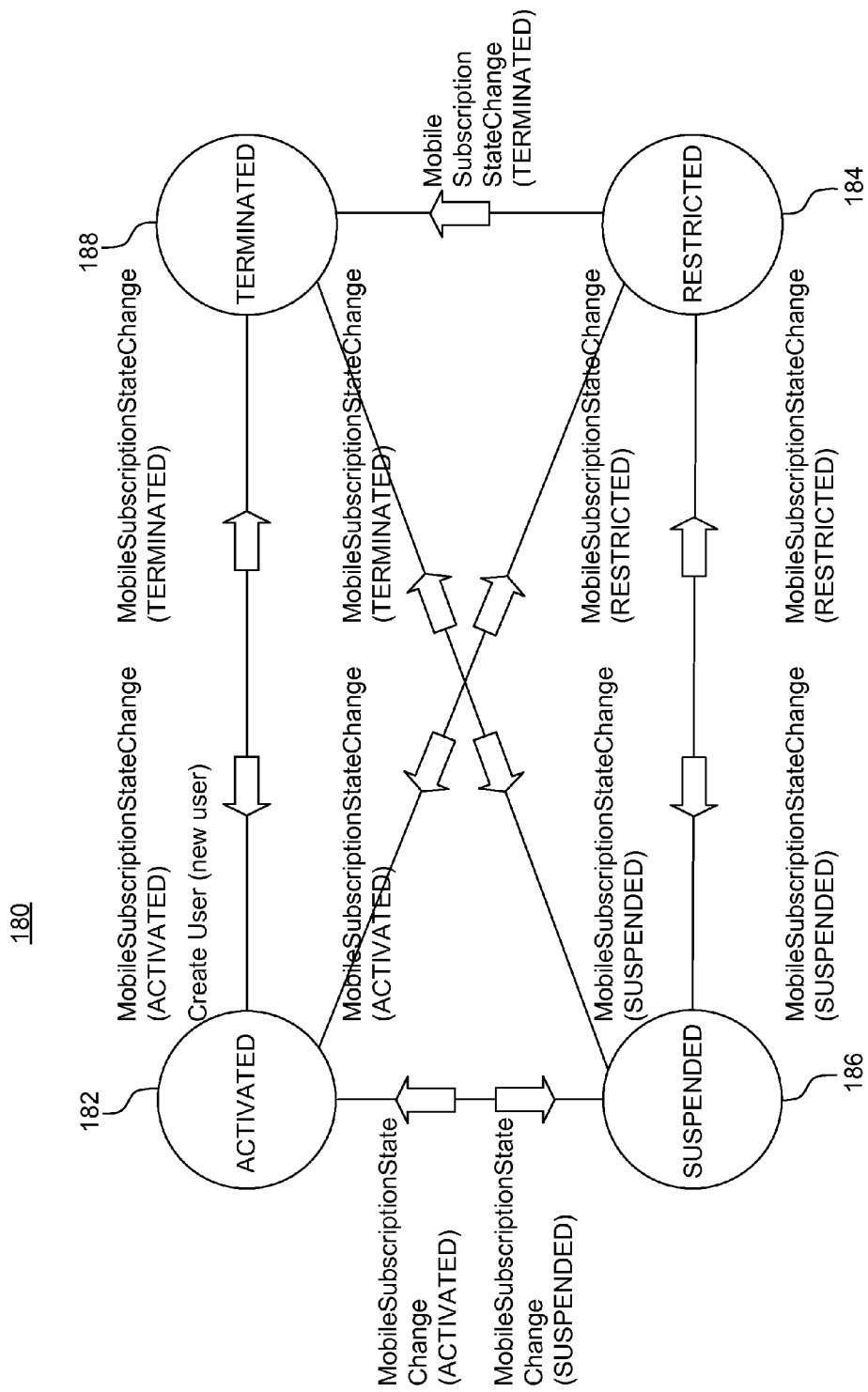
FIG. 1C is a state diagram showing different mobile subscription states according to an exemplary embodiment.

FIG. 1C depicts a state diagram 180 showing different mobile subscription states in accordance with an example embodiment of the invention. A central TSM may store a mobile subscription state corresponding to each secure element with the system. That is, each mobile device that includes a secure element is associated with a mobile subscription, and the mobile subscription state of such mobile subscription is stored in the central TSM.

As shown in the state diagram 180, the system may incorporate at least four mobile subscription states: an activated state 182 ("ACTIVATED"), a restricted state 184 ("RESTRICTED"), a suspended state 186 ("SUSPENDED"), and a terminated state 188 ("TERMINATED"). The activated and restricted states 182, 184 may indicate that the mobile subscription is active, so communications with the mobile device over the mobile network is possible. The suspended and terminated states 186, 188 may indicate that the mobile subscription is inactive, so the mobile device is incapable of receiving communications transmitted across the mobile network.

The activated state 182 may differ from the restricted state 184 in that the activated state 184 does not include any access restrictions for the mobile subscription. On the other hand, a restricted state 184 may impose certain restrictions for the mobile subscription, such that only certain forms or quantities of data, transmission speeds, or other restrictions are permitted across the mobile network.

The suspended state 186 may indicate that the mobile subscription is only temporarily inactive, but may potentially be reactivated back into one of the active states. The terminated state 188 may indicate that mobile subscription is permanently inactive, and cannot be reactivated.

Figure 2:
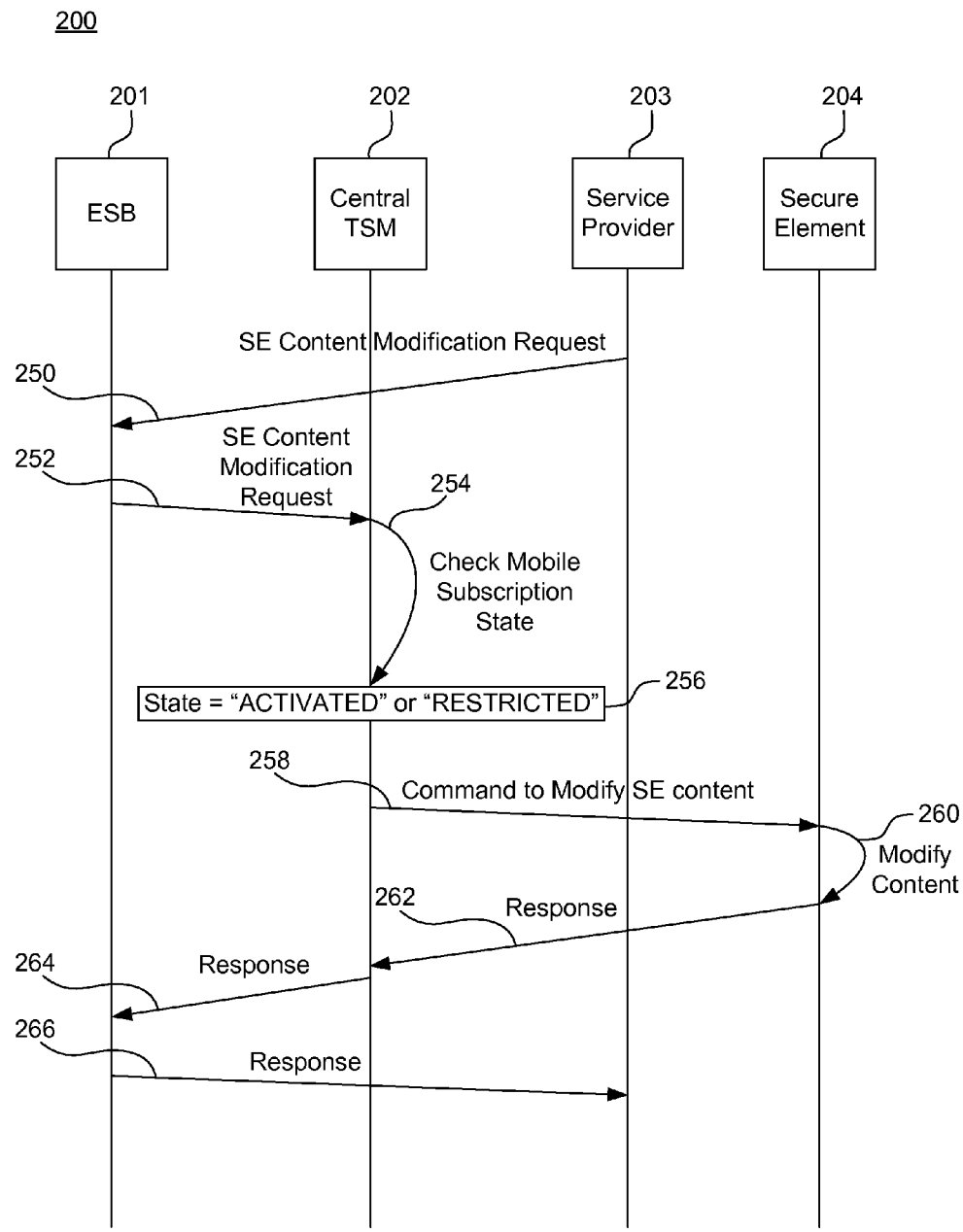
FIG. 2 is a sequence diagram illustrating a sequence for processing a request to modify content stored on a secure element of a mobile device according to an exemplary embodiment, in the scenario that the mobile subscription associated with the mobile device is in an active state.
Figure 3:
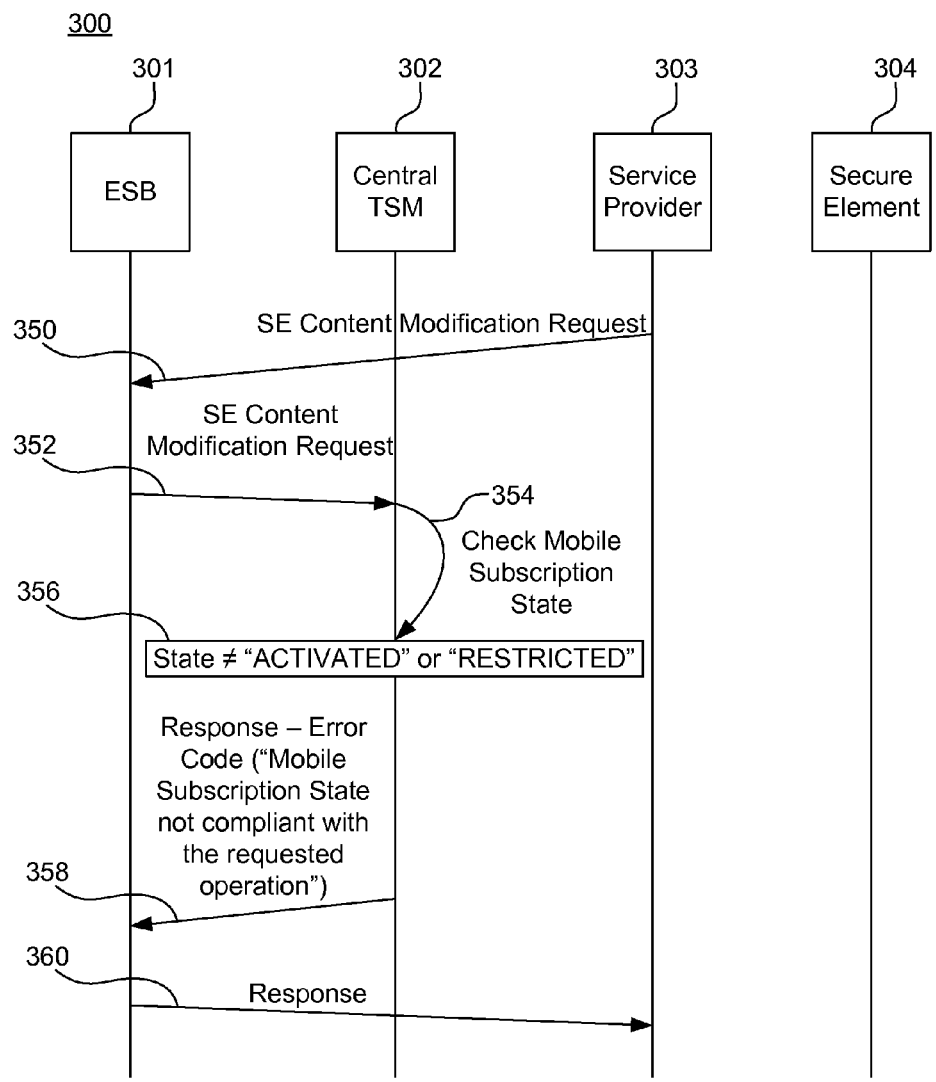
FIG. 3 is a sequence diagram illustrating a sequence for processing a request to modify content stored on a secure element of a mobile device according to an exemplary embodiment, in the scenario that the mobile subscription associated with the mobile device is in an inactive state.
Figure 4:
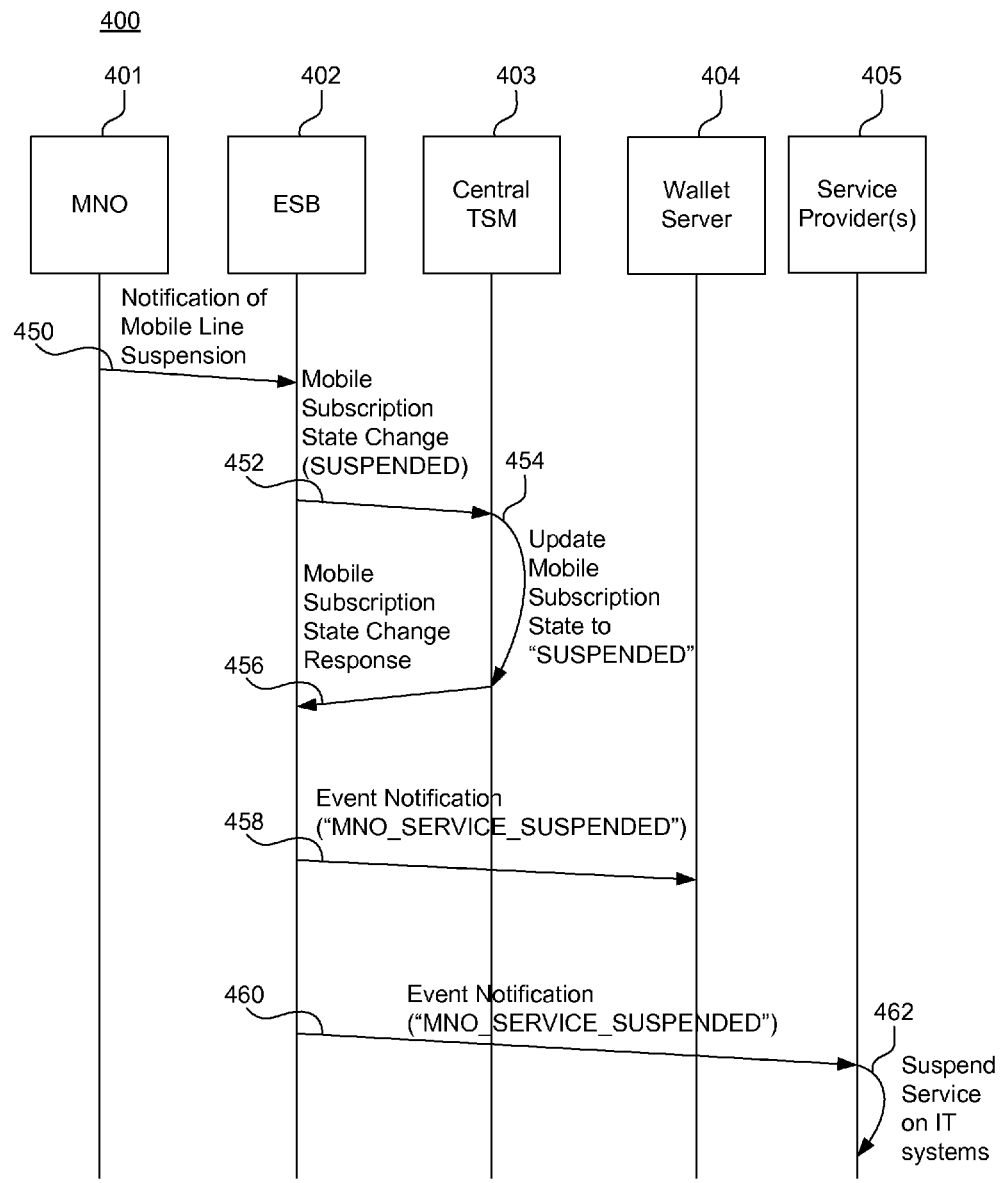
FIG. 4 is a sequence diagram for processing a notification that a mobile subscription, which corresponds to a particular mobile device containing a secure element, has been suspended, according to an exemplary embodiment.
Figure 5:
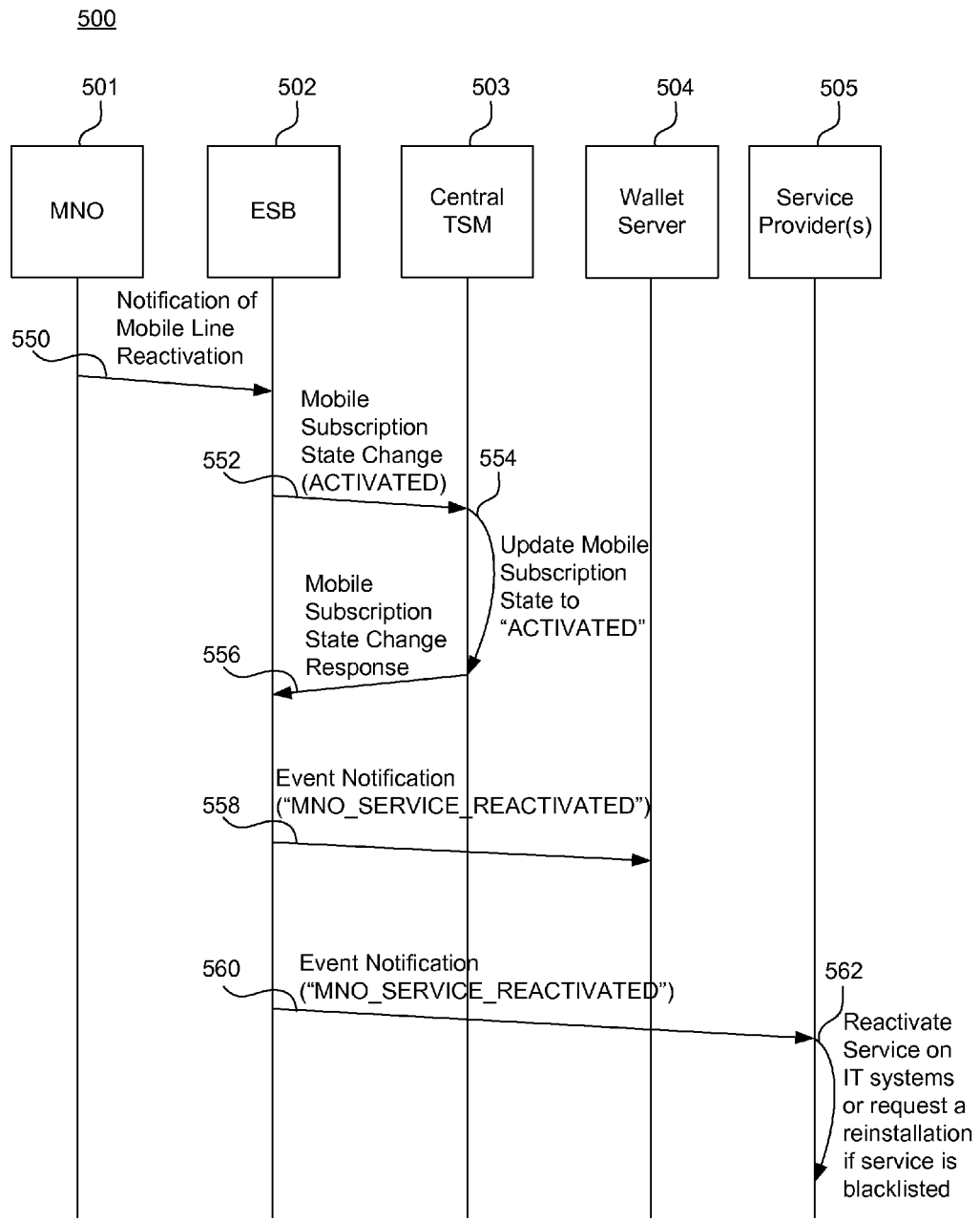
FIG. 5 is a sequence diagram for processing a notification that a mobile subscription, which corresponds to a particular mobile device containing a secure element, has been reactivated, according to an exemplary embodiment.

FIGS. 2 and 3 illustrate effects of the mobile subscription state on operations of the system 100, while FIGS. 4 and 5 illustrate possible transitions between mobile subscription states based on state change commands.

III. Process

A. Modification of Content Stored on a Secure Element

FIG. 2 depicts a sequence diagram 200 for processing a request to modify content stored on a secure element 204 of a mobile device according to an exemplary embodiment, in the scenario that the mobile subscription associated with the mobile device is in an active (e.g., activated) state. The request may be, for example, a request by a service provider 203 to add, delete, or update data on the secure element 204. It will also be appreciated that the request may originate from any other source, and may even be characterized as an indication other than a request, so long as data is ultimately designated for transmission to the secure element 204. As shown in FIG. 2, the sequence diagram 200 involves at least an ESB 201, a central TSM 202, a service provider 203, and a secure element 204.

At step 250, the service provider 203 transmits a request to the ESB 201 over a communications network. The request may be a request to modify content stored on the secure element 204. The request may identify a specific secure element to be modified according to a secure element identifier, a mobile subscription identifier, a mobile device number, and/or any other identifying information.

At step 252, the ESB 201 forwards the request over a communications network to the central TSM 202 to be processed. The request may be directly forwarded from the ESB 201 to the central TSM 202 in its original form if the central TSM 202 is capable of directly processing the request, or otherwise may be modified by the ESB 201 in a data format recognized by the central TSM 202. It will also be appreciated that the requests may be generated internally within the central TSM 202 (e.g., software updates to be transmitted to secure element 204), in which case steps 250 and 252 are not required.

At step 254, the central TSM 202 checks the mobile subscription state associated with the secure element 204 identified in the request. As described with respect to FIGS. 1B and 1C, mobile subscription states corresponding to secure elements are stored in the memory 102b within the central TSM 202. The central TSM 202 retrieves, from the memory 102b, the mobile subscription state that corresponds to the identified secure element 204. The mobile subscription state includes information indicating a state of a mobile device associated with the identified secure element 204, particularly a state of a mobile subscription associated with such mobile device. As discussed above, the mobile subscription state may be one of at least "ACTIVATED", "RESTRICTED", "SUSPENDED", and "TERMINATED". The "ACTIVATED" and "RESTRICTED" states may indicate that the mobile subscription is active, so communications with the mobile device over the mobile network are possible. The "SUSPENDED" and "TERMINATED" states may indicate that the mobile subscription is inactive, so the mobile device is incapable of receiving communications transmitted across the mobile network.

In step 254, the central TSM 202 checks whether the mobile subscription state is in an active state (e.g., "ACTIVATED" or "RESTRICTED" state), or whether the mobile subscription state is in an inactive state (e.g., "SUSPENDED" or "TERMINATED" state). If the mobile subscription is in an active state, the mobile device is capable of receiving transmissions over the mobile network. If the mobile subscription is in an inactive state, the mobile subscription is inactive, and transmissions sent over the mobile network will not be received by the mobile device.

In the scenario depicted in FIG. 2, the mobile subscription associated with the mobile device of the secure element 204 is in an "ACTIVATED" or "RESTRICTED" state. As such, at step 256, the central TSM 202 concludes that reception by the mobile device of transmissions over the mobile subscription is possible.

At step 258, the central TSM 202 sends a command across the mobile network to the mobile device associated with the secure element 204. The command includes instructions that, when executed by the secure element 204, modify content within the secure element 204 in accordance with the content modification request sent by the service provider 203 in step 250. The command may also include identifier information, passcodes, setting information, flags/arguments, and/or any other information relating to the command for execution by the secure element 204.

At step 260, the secure element 204 executes the command, which modifies content stored on the secure element 204 in accordance with the content modification request.

At step 262, the secure element 204 transmits a response over the mobile network to the central TSM 202. The response indicates whether the secure element 204 successfully executed the command in step 260, such that the appropriate content has been modified on the secure element 204.

At step 264, the central TSM 202 forwards the response over a communications network to the ESB 201. Similar to the request sent in step 252, the response may be directly forwarded from the central TSM 202 to the ESB 201 in its original form if the ESB 201 is capable of directly processing the response, or otherwise may be modified by the central TSM 202 in a data format recognized by the ESB 201.

At step 266, the ESB 201 forwards the response over a communications network to the service provider 203. As with the response in step 264, the response may be directly forwarded from the ESB 201 to the service provider 203 in its original form if the service provider 203 is capable of directly processing the response, or otherwise may be modified by the ESB 201 in a data format recognized by the service provider 203.

In the circumstance that the request was generated internally by the central TSM 202, steps 264 and 266 may be skipped.

FIG. 3 depicts a sequence diagram 300 for processing the request to modify content stored on the secure element 204 according to the exemplary embodiment, in the scenario that the mobile subscription associated with the mobile device is in an inactive (e.g., "SUSPENDED") state. It will be appreciated that as FIG. 3 differs from FIG. 2 only in the particular status of the mobile subscription state, the requests being processed in the sequence of FIG. 3 are the same as those being processed in the sequence of FIG. 2. As shown in FIG. 3, the sequence diagram 300 involves at least an ESB 301, a central TSM 302, a service provider 303, and a secure element 304.

At step 350, the service provider 303 transmits a request over a communications network to the ESB 301 over a communications network, similar to step 250. As with step 250, the request may be a request to modify content stored on the secure element 304, and may identify a specific secure element to be modified according to a secure element identifier, a mobile subscription identifier, a mobile device number, and/or any other identifying information.

At step 352, the ESB 301 forwards the request over a communications network to the central TSM 302 to be processed, similar to step 252. As with step 252, the request may be directly forwarded from the ESB 301 to the central TSM 302 in its original form if the central TSM 302 is capable of directly processing the request, or otherwise may be modified by the ESB 301 in a data format recognized by the central TSM 302. It will also be appreciated that the requests may be generated internally within the central TSM 302 (e.g., software updates to be transmitted to secure element 304), in which case steps 350 and 352 are not required.

At step 354, the central TSM 302 checks the mobile subscription state associated with the secure element 304 identified in the request, similar to step 254. However, while the mobile subscription state of the corresponding mobile subscription in the scenario of FIG. 2 is "ACTIVATED" or "RESTRICTED", the mobile subscription state in the scenario of FIG. 3 is "SUSPENDED" or "TERMINATED".

As such, at step 356, the central TSM 302 concludes that reception by the mobile device of transmissions over the mobile network is not possible, since the mobile subscription is inactive.

At step 358, the central TSM 302 transmits a response over a communications network to the ESB 301. The response indicates an error associated with processing the request. The response may include a code (e.g., error code) or string that corresponds to this error. For instance, the response may include the error code that indicates "Mobile Subscription State not compliant with the requested operation". Of course, it will be appreciated that the error data may be encoded according to any other format, as long as the error data is capable of ultimately being decoded.

At step 360, the ESB 301 forwards the response over a communications network to the service provider 303. As with the response in step 266, the response may be directly forwarded from the ESB 301 to the service provider 303 in its original form if the service provider 303 is capable of directly processing the response, or otherwise may be modified by the ESB 301 in a data format recognized by the service provider 303.

B. Updating a Mobile Subscription State

In an exemplary embodiment of the invention, a mobile subscription state is updated. The mobile subscription state is described above with respect to FIGS. 1B and 1C.

FIG. 4 depicts a sequence diagram 400 for processing a notification that a mobile subscription, which corresponds to a particular mobile device containing a secure element, has been suspended. This notification updates a mobile subscription state stored within the central TSM 403 corresponding to the secure element. With the updated mobile subscription state, the central TSM 403 recognizes that the mobile subscription connecting the mobile device to a corresponding MNO is not active, so any transmissions sent to the mobile device will not be received. This sequence may be executed when the existing state is other than a suspended state. It will also be recognized that the sequence diagram 400 is applicable to any other mobile subscription states besides a suspended state. As shown in FIG. 4, the sequence diagram 400 involves at least an MNO 401, an ESB 402, a central TSM 403, a wallet server 404, and at least one service provider 405.

At step 450, the MNO 401 transmits a notification over a communications network to the ESB 402 that a mobile subscription has been suspended. The notification includes information to identify a specific mobile subscription, such as a mobile subscription identifier, mobile device number, secure element identifier, or any identifier corresponding to a mobile subscription.

The mobile subscription may have been suspended for any number of reasons. In certain scenarios, the MNO 401 may suspend the mobile subscription on the initiative of a mobile device owner. For instance, a mobile device owner may report a lost or stolen mobile device to the MNO 401, and the MNO 401 suspends the corresponding mobile subscription to prevent fraudulent use of the mobile device. Or, the mobile device owner may have disabled roaming capabilities, and the MNO 401 suspends the mobile subscription when the mobile device connects outside a home network.

Alternatively, the MNO 401 may suspend the mobile subscription on its own initiative (e.g., for delinquency of bill payment for the mobile subscription account).

At step 452, the ESB 402 forwards the notification to the central TSM 403. The request may be directly forwarded from the ESB 402 to the central TSM 403 in its original form if the central TSM 403 is capable of directly processing the request, or otherwise may be modified by ESB 402 in a data format recognized by the central TSM 403.

At step 454, the central TSM 403 updates a memory to reflect that the mobile subscription state for the mobile subscription associated with the notification is in a suspended state.

At step 456, the central TSM 403 transmits a response to the notification forwarded in step 452. The response indicates that the mobile subscription state corresponding to the respective mobile subscription has been updated to reflect a suspended mobile subscription.

At step 458, upon receiving the response in step 456, the central ESB 402 transmits an event notification to the wallet server 404, notifying the wallet server 404 that the mobile network service corresponding to the respective mobile subscription has been suspended. The event notification may be constructed according to any particular format recognized by the wallet server 404, including an event notification according to the string "MNO_Service_Suspended" and an identifier such as a secure element identifier, a mobile subscription identifier, a mobile device number, and/or any other identifying information.

At step 460, the central ESB 402 transmits an event notification to one or more service providers 405. The event notification informs a service provider 405 that the mobile network service corresponding to the respective mobile subscription has been suspended. The event notification may be identical to the notification transmitted in step 458, or may be constructed according to a different format. If multiple service providers are being notified, an event notification may be individually transmitted to each service provider, or a single event notification may be multicast to the multiple service providers. In one embodiment, the event notification is formatted according to an established API definition, such as "event Notification ("MNO_SERVICE_SUSPENDED")". However, as with the notification in step 458, the event notification may be constructed according to any particular format recognized by the service provider(s) 405, and may include an identifier such as a secure element identifier, a mobile subscription identifier, a mobile device number, and/or any other identifying information.

At step 462, the service provider(s) 405 suspend the services on their respective computing systems that correspond to the suspended mobile subscription. That is, the service provider(s) 405 configure their computing systems such that transactions corresponding to the secure element within the mobile device of the suspended mobile subscription will not be processed.

It will be appreciated that sequence diagram 400 is applicable for updating other changes in the state of a mobile subscription, beyond the depicted scenario of changing the mobile subscription state to "SUSPENDED". For instance, the mobile subscription state may be changed to "TERMINATED" or any other state indicating that the mobile subscription is inactive.

FIG. 5 depicts a sequence diagram 500 for processing a notification that a mobile subscription, which corresponds to a particular mobile device containing a secure element, has been reactivated. This notification updates a mobile subscription state stored within the central TSM 503 corresponding to the secure element. With the updated mobile subscription state, the central TSM 503 recognizes that the mobile subscription connecting the mobile device to a corresponding MNO has been re-activated, so that any transmissions sent to the mobile device may now be received. This sequence may be executed when the existing state is other than an activated state. It will also be recognized that the sequence diagram 500 is applicable to any other mobile subscription state besides a suspended state. As shown in FIG. 5, the sequence diagram 400 involves at least an MNO 501, an ESB 502, a central TSM 503, a wallet server 504, and at least one service provider 505.

At step 550, the MNO 501 transmits a notification over a communications network to the ESB 502 that a mobile subscription has been reactivated. The notification includes information to identify a specific mobile subscription, such as a mobile subscription identifier, mobile device number, secure element identifier, or any identifier corresponding to a mobile subscription. The notification may be similar to the notification transmitted in step 450, except that a different parameter is provided indicating the reactivation of the mobile subscription. Alternatively, the notification may be in an entirely different format from the one in step 450.

The mobile subscription may have been reactivated for any number of reasons. In certain scenarios, the MNO 501 may reactivate the mobile subscription on the initiative of a mobile device owner. For instance, a mobile device owner may report to the MNO 501 that a previously lost or stolen mobile device has been recovered, and the MNO 501 reactivates the corresponding mobile subscription to restart use of the mobile device. Or, where the mobile device owner disabled roaming capabilities and the mobile device was previously outside of the home network, the MNO 501 may reactivate the mobile subscription when the mobile device reconnects within a home network.

Alternatively, the MNO 501 may reactivate the mobile subscription on its own initiative (e.g., to lift a mobile subscription suspension resulting from nonpayment of mobile subscription bills, when the payment is finally made).

At step 552, the ESB 502 forwards the notification to a central TSM 503. As with step 452, the request may be directly forwarded from the ESB 502 to the central TSM 503 in its original form if the central TSM 503 is capable of directly processing the request, or otherwise may be modified by ESB 502 in a data format recognized by the central TSM 503.

At step 554, the central TSM 503 updates its memory to reflect that the mobile subscription state for the mobile subscription associated with the notification is in an activated state.

At step 556, the central TSM 503 transmits a response to the notification forwarded in step 552. The response indicates that the mobile subscription state corresponding to the respective mobile subscription has been updated to reflect an activated mobile subscription. The response may be similar to the response transmitted in step 456, except that a different parameter is provided indicating the reactivation of the mobile subscription. Alternatively, the response may be in an entirely different format from the one in step 456.

At step 558, upon receiving the response in step 556, the central ESB 502 transmits an event notification to a wallet server 504, notifying the wallet server 504 that the mobile network service corresponding to the respective mobile subscription has been reactivated. The event notification may be constructed according to any particular format recognized by the wallet server 504, including an event notification according to the string "MNO_Service_Reactivated" and an identifier such as a secure element identifier, a mobile subscription identifier, a mobile device number, and/or any other identifying information. The event notification may be similar to the notification transmitted in step 458, except that a different parameter is provided indicating reactivation. Alternatively, the notification may be in an entirely different format from the one in step 458.

At step 560, the central ESB 502 transmits an event notification to one or more service providers 505. The event notification informs the service provider 505 that the mobile network service corresponding to the respective mobile subscription has been reactivated. The event notification may be identical to the notification transmitted in step 558, or may be constructed according to a different format. If multiple service providers are being notified, an event notification may be individually transmitted to each service provider, or a single event notification may be multicast to the multiple service providers. In one embodiment, the event notification is formatted according to an established API definition, such as "event Notification ("MNO_SERVICE_REACTIVATED")". However, as with the notification in step 558, the event notification may be constructed according to any particular format recognized by the service provider(s) 505, and may include an identifier such as a secure element identifier, a mobile subscription identifier, a mobile device number, and/or any other identifying information. The event notification may be similar to the notification transmitted in step 460, except that a different parameter is provided indicating reactivation. Alternatively, the notification may be in an entirely different format from the one in step 460.

At step 562, the service provider(s) 505 reactivate the services on their respective computing systems that correspond to the reactivated mobile subscription. That is, the service provider(s) 505 configure their computing systems such that transactions corresponding to the secure element within the mobile device of the suspended mobile subscription will be processed. In some cases, a service may have been blacklisted, such that the instance of the service has been permanently disabled and cannot be reactivated. In this case, the service provider 505 may request a complete reinstallation of the service to re-enable usage of the service.

It will be appreciated that sequence diagram 500 is applicable for updating other changes in the state of a mobile subscription, beyond the depicted scenario of changing the mobile subscription state to "ACTIVATED". For instance, the mobile subscription state may be changed to "RESTRICTED" or any other state indicating that the mobile subscription is active.

C. Updating of Mobile Wallet State

In an exemplary embodiment of the invention, a mobile wallet state is updated. The mobile wallet state is described above with respect to FIG. 1B. In one embodiment, the mobile wallet state is updated independently from the mobile subscription state. In an alternative embodiment, the mobile wallet state may be updated concurrently with the mobile subscription state.

Figure 6:
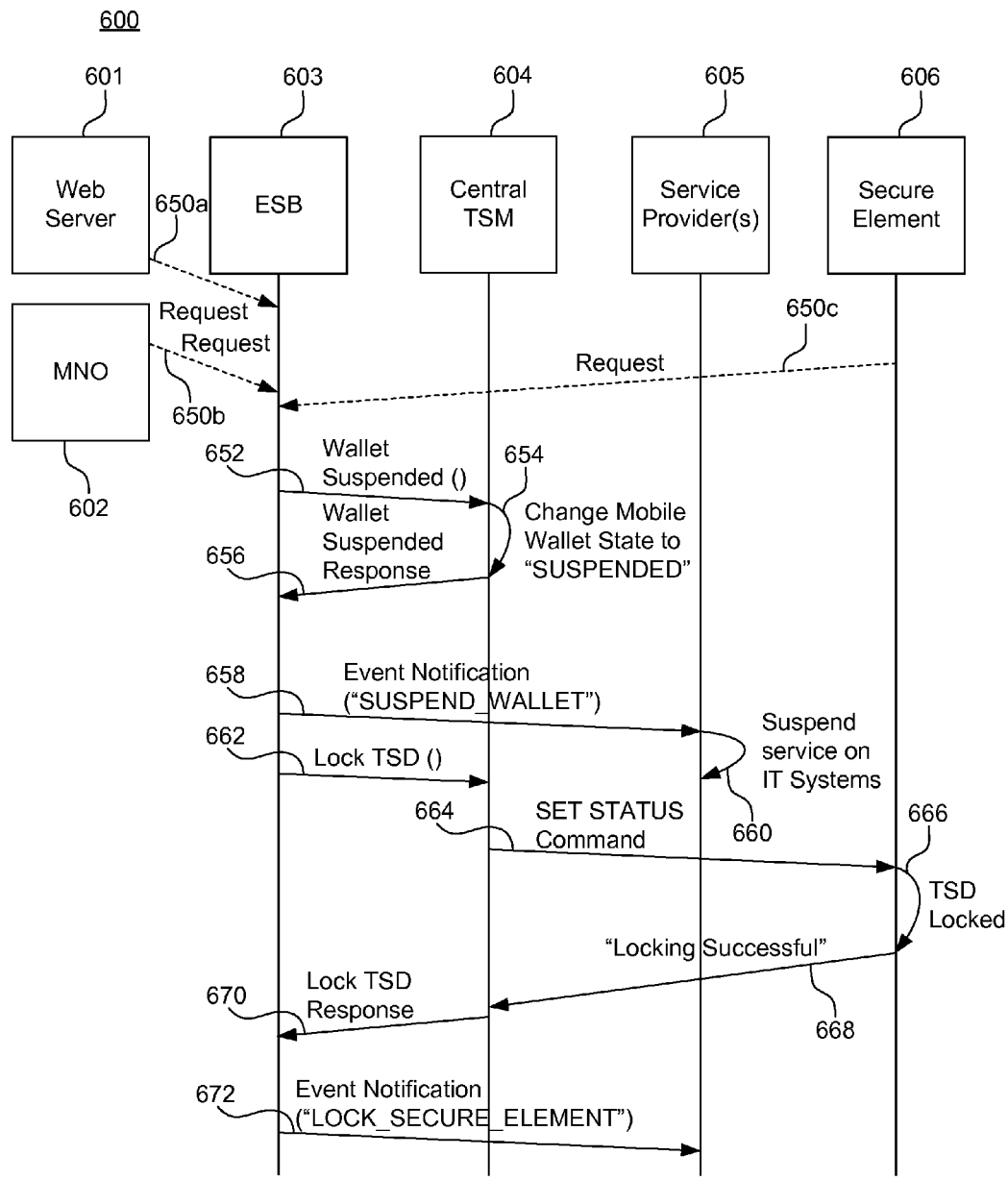
FIG. 6 is a sequence diagram for processing a request to suspend a mobile wallet according to an exemplary embodiment.

FIG. 6 depicts a sequence diagram 600 for processing a request to suspend a mobile wallet. It will be understood that the request may have been received directly from a customer (e.g., via a web site or the customer's mobile device). Or, the request may be linked to the notification of a suspended mobile subscription state as described above, such that receiving a notification of a suspended mobile subscription by an MNO (e.g., as a result of a lost or stolen mobile device) results in both the suspension of the mobile subscription state and the suspension of the mobile wallet for the secure element within the corresponding mobile device. The request to suspend a mobile wallet results in an updating of a mobile wallet state within the system. In one embodiment, the suspension of a mobile wallet involves both the locking of functions on the mobile device, along with suspension of services associated with the mobile wallet within a central TSM and any service providers having established relationships with the mobile wallet. As shown in FIG. 6, the sequence diagram 600 involves at least a web server 601, an MNO 602, an ESB 603, a central TSM 604, a service provider 605, and a secure element 606.

At step 650a/650b/650c, the ESB 603 receives a request over a communications network to suspend a mobile wallet. The request may have been transmitted from one of any number of sources, including from the web server 601 hosting a web site (step 650a), from the MNO 602 (step 650b), or from the secure element 606 within a mobile device (step 650c). In the case of step 650a where the web server 601 transmits the request, the web server 601 may have generated the request upon instructions from a customer, a system administrator, an automated script, or any other source. In the case of step 650b where the MNO 602 transmits the request, the request may simply constitute the notification of mobile subscription suspension as described in step 450, or may be a separate request to suspend the mobile wallet. It will also be appreciated that the request may originate from any other source. The requests transmitted from the web server 601, the MNO 602, and the secure element 606 may be identical in data format, or may be different as long as the ESB 603 is capable of processing the request.

At step 652, the ESB 603 transmits a request over a communications network to a central TSM 604 to reflect a suspended mobile wallet state. In one embodiment, the request is formatted according to an established API definition, such as "WalletSuspended ( )", and includes at least parameters for identifying the specific mobile wallet being suspended. In that embodiment, the mobile wallet is identified according to a customer reference identifier, but may also be identified according to a secure element identifier, a mobile subscription identifier, a mobile device number, and/or any other identifying information.

At step 654, the central TSM 604 updates a memory to reflect that the mobile wallet state for the identified mobile wallet is a suspended state.

At step 656, the central TSM 604 transmits a response over a communications network to the ESB 603, responding to the request transmitted in step 652. The response contains data indicating whether the mobile wallet state was successfully changed in step 654.

At step 658, the ESB 603 transmits an event notification over a communications network to one or more service providers 605. The notification informs a service provider 605 that a specific mobile wallet has been suspended. If multiple service providers are being notified, an event notification may be individually transmitted to each service provider, or a single event notification may be multicast to the multiple service providers. In one embodiment, the event notification is formatted according to an established API definition, such as "Event Notification ("SUSPEND_WALLET")". However, the event notification may be constructed according to any particular format recognized by the service provider(s) 605, and may include an identifier such as a customer reference identifier, secure element identifier, a mobile subscription identifier, a mobile device number, and/or any other identifying information.

At step 660, the service provider(s) 605 suspend the services on their computing systems that correspond to the suspended mobile wallet. That is, the service provider(s) 605 configure their computing systems such that transactions corresponding to the suspended mobile wallet will not be processed.

At step 662, the ESB 603 transmits a request over a communications network to the central TSM 604 to lock the secure element 606 that corresponds to the suspended mobile wallet. In one embodiment, the locking of the secure element 606 includes at least the locking of a security domain on the secure element 606, such as a security domain ("TSD") of the central TSM 604. In another embodiment, the request is formatted according to an established API definition, such as "Lock TSD ( )", with at least a parameter that identifies a secure element. In an exemplary embodiment, such parameter is a customer reference identifier, but may consist or include other identifier(s) such as a secure element identifier, a mobile subscription identifier, a mobile device number, and/or any other identifying information.

At step 664, the central TSM 604 transmits a command over a communications network to the mobile device corresponding to the secure element 606, to lock the TSD within the secure element 606. In one embodiment, the command is transmitted over the mobile network connecting the mobile device, and is formatted according to an established API definition, such as "SET STATUS". In addition, the command is formatted as "SET STATUS (AID, P1=60, P2 b8=1)", where AID is an application identifier of the TSD. In one embodiment, "SET STATUS" is defined in the API to be used for changing a life cycle state of the TSD. In an alternative embodiment, the command is transmitted via a secure channel protocol across the mobile network. It is recognized that the specific secure channel protocol may vary in accordance with a specific profile or type of the secure element 606. For instance, if the secure element 606 is integrated within a SIM card of the mobile device, a first secure channel protocol may be used. If the secure element 606 is integrated within a removable microSD card or is integrated into the mobile device hardware, a second, different secure channel protocol may be used. The secure element 606 receives the command upon reception by the mobile device.

At step 666, the secure element 606 locks the TSD. The locking operation may be accomplished via an execution of functions, a hardware change, a software change, or a combination of all. If the locking operation is processed successfully, at least some of the associated applications and service provider security domains within the secure element 606 are no longer selectable.

At step 668, the secure element 606 transmits a response over a communications network to the central TSM 604. The response informs the central TSM 604 of whether the locking process at step 666 is successful. The response may include a parameter indicating "Locking Successful", which may be integrated in the response as either a flag parameter or as a string.

At step 670, the central TSM 604 transmits a response over a communications network to the ESB 603, responding to the request transmitted in step 662. The response contains data indicating whether the TSD has been successfully locked, or whether the TSD locking operation failed.

At step 672, the ESB 603 transmits an event notification over a communications network to one or more service providers 605. The notification informs a service provider 605 that the secure element 606 has been locked. As with the notification in step 658, if multiple service providers are being notified, an event notification may be individually transmitted to each service provider, or a single event notification may be multicast to the multiple service providers. In one embodiment, the event notification is formatted according to an established API definition, such as "Event Notification ("LOCK_SECURE_ELEMENT")". However, the event notification may be constructed according to any particular format recognized by the service provider(s) 605, and may include an identifier such as a customer reference identifier, secure element identifier, a mobile subscription identifier, a mobile device number, and/or any other identifying information.

Figure 7:
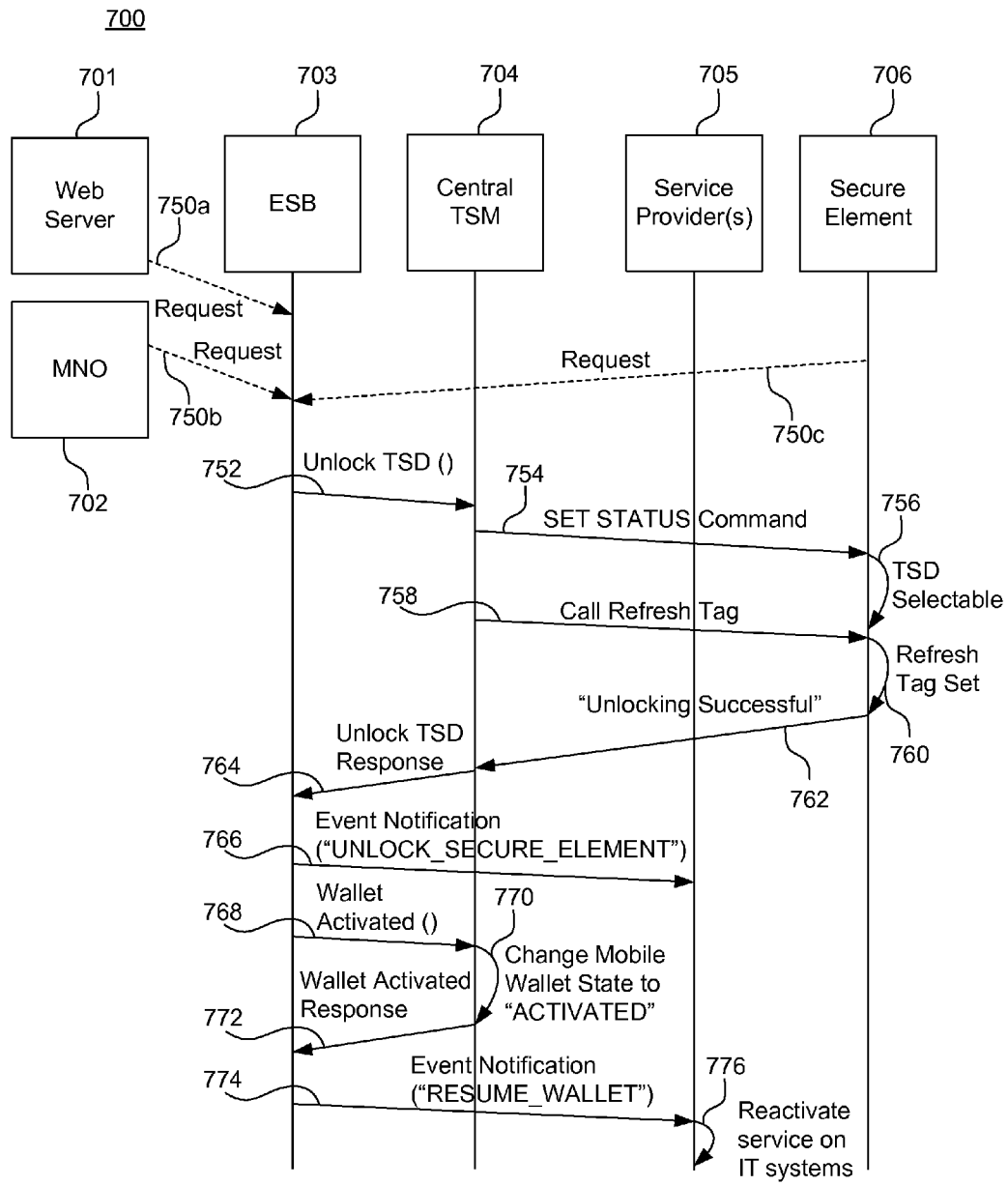
FIG. 7 is a sequence diagram for processing a request to reactivate a mobile wallet according to an exemplary embodiment.

FIG. 7 depicts a sequence diagram 700 for processing a request to reactivate a mobile wallet. It will be understood that the request may be received directly from a customer (e.g., via a web site or the customer's mobile device). Or, the request may be linked to the notification of a reactivated mobile subscription state as described above, such that receiving a notification of a reactivated mobile subscription by an MNO (e.g., by recovering a lost or stolen mobile device) results in both the reactivation of the mobile subscription state and the reactivation of the mobile wallet for the secure element associated with the corresponding mobile device. The request to reactivate a mobile wallet results in an updating of a mobile wallet state within the system. In an alternative embodiment, the reactivation of the mobile wallet also involves both the unlocking of functions on the mobile device, along with reactivation of the services within a central TSM and any service providers having established associations with the mobile wallet. As shown in FIG. 7, the sequence diagram 700 involves at least a web server 701, an MNO 702, an ESB 703, a central TSM 704, a service provider 705, and a secure element 706.

At step 750a/750b/750c, the ESB 703 receives a request over a communications network to unlock a mobile wallet. The request may be transmitted from one of any number of sources, including from the web server 701 hosting a web site (step 750a), from the MNO 702 (step 750b), or from the secure element 706 within a mobile device (step 750c). In the case of step 750a where the web server 701 transmits the request, the web server 701 may have generated the request upon instructions from a customer, a system administrator, an automated script, or any other source. In the case of step 750b where the MNO 702 transmits the request, the request may include the notification of mobile subscription reactivation as described in step 550, or may be a separate request to unlock the mobile wallet. It will also be appreciated that the request may originate from any other source than the MNO 702. The requests transmitted from the web server 701, the MNO 702, and the secure element 706 may be identical in data format, or may be different as long as the ESB 703 is capable of processing the request.

At step 752, the ESB 703 transmits a request over a communications network to the central TSM 704 to unlock the secure element 706 that corresponds to the mobile wallet to be reactivated. In one embodiment, the unlocking of the secure element 706 includes at least the unlocking of a security domain on the secure element 706, with such security domain being a security domain (i.e., TSD) of the central TSM 704. In one embodiment, the request is formatted according to an established API definition, such as "Unlock TSD ( )", with at least a parameter that identifies a secure element. In an alternative embodiment, such parameter is a customer reference identifier, but may consist or include other identifier(s) such as a secure element identifier, a mobile subscription identifier, a mobile device number, and/or any other identifying information.

At step 754, the central TSM 704 transmits a command over a communications network to the mobile device corresponding to the secure element 706, to unlock the TSD within the secure element 706. According to an exemplary embodiment, the command is transmitted over the mobile network connecting the mobile device, and is formatted according to an established API definition, such as "SET STATUS" as discussed with respect to step 664. In an alternative embodiment, the command is formatted as "SET STATUS (AID, P1=60, P2 b8=0)", where AID is an application identifier of the TSD. In an exemplary embodiment, as discussed above, "SET STATUS" is defined in the API to be used for changing a life cycle state of the TSD. As discussed above with respect to step 664, the SET STATUS command is transmitted via a secure channel protocol across the mobile network, and may involve different (e.g., first and second) secure channel protocols, depending on a specific profile or type of the secure element 706 (e.g., SIM card, microSD, or integrated within mobile device hardware). The secure element 706 receives the command upon reception by the mobile device.

At step 756, the secure element 706 unlocks the TSD. The unlocking operation may be accomplished according via a hardware change, a software change, or a combination of both hardware and software. In one embodiment, the unlocking process operates according to the same methodology used to lock the TSD in step 666. If the unlocking operation is processed successfully, some or all of the associated applications within the secure element 706, and some or all of the service provider security domains, are set to be accessible. Thus, all of the associated applications and the service provider security domains can be again selectable.

At step 758, the central TSM 704 transmits a rules-refresh command over a communications network to the mobile device corresponding to the secure element 706. The command instructs the secure element 706 to call a refresh tag within its master application access rule. This instruction forces a rules enforcer application to request a rules update. A rules update ensures that the secure element is properly updated according to present parameters as established by the central TSM 704.

At step 760, the secure element 706 sets its refresh tag as instructed, which initiates a rules update for the secure element 706.

At step 762, the secure element 706 transmits a response over a communications network to the central TSM 704. The response informs the central TSM 704 of whether the unlocking operation of the secure element 706 was successful. The response may include a parameter indicating "Unlocking Successful", which may be integrated in the response as either a flag parameter or as a string.

At step 764, the central TSM 704 transmits a response over a communications network to the ESB 703, responding to the request transmitted in step 752. The response contains data indicating whether the TSD has been successfully unlocked, or whether the TSD unlocking operation failed.

At step 766, the ESB 703 transmits an event notification over a communications network to one or more service providers 705. The notification informs a service provider 705 that the secure element 706 has been unlocked. If multiple service providers are being notified, an event notification may be individually transmitted to each service provider, or a single event notification may be multicast to the multiple service providers. In one embodiment, the event notification is preferably formatted according to an established API definition, such as "Event Notification ("UNLOCK_SECURE_ELEMENT")". However, the event notification may be constructed according to any particular format recognized by the service provider(s) 705, and may include an identifier such as a customer reference identifier, secure element identifier, a mobile subscription identifier, a mobile device number, and/or any other identifying information.

At step 768, the ESB 703 transmits a request over a communications network to the central TSM 704 to reflect an activated mobile wallet state. In one embodiment, the request is formatted according to an established API definition, such as "WalletActivated ( )", and includes at least parameters for identifying the specific mobile wallet being suspended. In an exemplary embodiment, the mobile wallet is identified according to a customer reference identifier, but may also be identified according to a secure element identifier, a mobile subscription identifier, a mobile device number, and/or any other identifying information.

At step 770, the central TSM 704 updates a memory to reflect that the mobile wallet state for the identified mobile wallet is an activated state.

At step 772, the central TSM 704 transmits a response over a communications network to the ESB 703, responding to the request transmitted in step 768. The response contains data indicating whether the mobile wallet state was successfully changed in step 768.

At step 774, the ESB 703 transmits an event notification over a communications network to one or more service providers 705. The notification informs a service provider 705 that a specific mobile wallet has been resumed. As with the notification in step 766, if multiple service providers are being notified, an event notification may be individually transmitted to each service provider, or a single event notification may be multicast to the multiple service providers. In one embodiment, the event notification is formatted according to an established API definition, such as Event Notification ("RESUME_WALLET"). However, the event notification may be constructed according to any particular format recognized by the service provider(s) 705, and may include an identifier such as a customer reference identifier, secure element identifier, a mobile subscription identifier, a mobile device number, and/or any other identifying information.

At step 776, the service provider(s) 705 resume the services on their computing systems that correspond to the reactivated mobile wallet. That is, the service provider(s) 705 configure their computing systems such that transactions corresponding to the reactivated mobile wallet will be processed.

IV. Computer Readable Medium Implementation

The example embodiments described above such as, for example, the systems and procedures depicted in or discussed in connection with FIGS. 1 to 7, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a non-transitory storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the non-transitory computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to suspend mobile wallet application functions on secure elements using a central trusted service manager that interfaces between a plurality of service providers and secure elements, comprising:
    a mobile computing device comprising a secure element; and
    a central trusted service manager computing system that interfaces between a plurality of service providers and a plurality of secure elements, the central trusted service manager computing system comprising a storage device and at least one processor communicatively coupled to the storage device, wherein the at least one processor executes application code instructions that are stored in the storage device to cause the central trusted service manager computing system to:
        receive a first instruction to suspend a mobile wallet application associated with the mobile computing device secure element;
        process the first instruction by modifying a mobile wallet application state maintained by the central trusted service manager computing system to a suspended state;
        transmit a second instruction to the mobile computing device to suspend at least one security domain of the mobile computing device secure element that is associated with the suspended mobile wallet application; and
        receive a response from the mobile computing device confirming that the at least one security domain of the mobile computing device secure element has been suspended.

2. The system of claim 1, wherein the first instruction is received from a mobile network operator computing system associated with the mobile computing device.

3. The system of claim 1, wherein the processor is further configured to execute application code instructions that are stored in the storage device to cause the central trusted service manager computing system to transmit a notification to one or more service provider computing systems that the at least one security domain of the mobile computing device or of a secure element has been suspended.

4. The system of claim 3, wherein the one or more service providers comprises an issuer computing system.

5. The system of claim 1, wherein the mobile wallet application state comprises a state of the mobile wallet application associated with the mobile computing device secure element that identifies whether the mobile wallet application can conduct transactions.

6. The system of claim 1, wherein the processor is further configured to execute application code instructions that are stored in the storage device to cause the central trusted service manager to:
    receive a third instruction to reactivate the mobile wallet application associated with the mobile computing device secure element;
    process the third instruction by modifying the mobile wallet application state from a suspended state to an active state;
    transmit a fourth instruction to the mobile computing device to reactivate the at least one suspended security domain of the mobile computing device secure element; and
    receive a second response from the mobile computing device, the second response confirming that the at least one suspended security domain of the mobile computing device secure element has been activated.

7. The system of claim 6, wherein activating the at least one suspended security domain of the mobile computing device secure element comprises unlocking or permitting access to the at least one security domain of the mobile computing device secure element.

8. The system of claim 1, wherein suspending the at least one security domain of the mobile computing device secure element comprises locking or preventing access to the at least one security domain of the mobile computing device secure element.

9. A method to suspend mobile wallet application functions on secure elements using a central trusted service manager that interfaces between a plurality of service providers and secure elements, comprising:
    receiving, by a central trusted service manager computing system, a first instruction to suspend a mobile wallet application associated with a mobile computing device secure element;
    processing, by the central trusted service manager computing system, the first instruction by modifying a mobile wallet application state maintained by the central trusted service manager computing system to a suspended state;
    transmitting, by the central trusted service manager computing system, a second instruction to a mobile computing device to suspend at least one security domain of the mobile computing device secure element that is associated with the suspended mobile wallet application; and
    receiving, by the central trusted service manager computing system, a response from the mobile computing device, the response confirming that the at least one security domain of the mobile computing device secure element has been suspended.

10. The method of claim 9, wherein the first instruction is received from a mobile network operator computing system associated with the mobile computing device.

11. The method of claim 9, further comprising transmitting a notification to one or more service provider computing systems that the at least one security domain of the mobile computing device secure element has been suspended.

12. The method of claim 11, wherein the one or more service providers comprises an issuer computing system.

13. The method of claim 9, wherein the mobile wallet application state comprises a state of the mobile wallet application associated with the mobile computing device secure element that identifies whether the mobile wallet application can conduct transactions.

14. The method of claim 9, further comprising:
    receiving, by the central trusted service manager computing system, a third instruction to reactivate the mobile wallet application associated with the mobile computing device secure element;

processing, by the central trusted service manager computing system, the third instruction by modifying the mobile wallet application state from a suspended state to an active state;

transmitting, by the central trusted service manager computing system, a fourth instruction to the mobile computing device to reactivate the at least one suspended security domain of the mobile computing device secure element; and receiving, by the central trusted service manager computing system, a second response from the mobile computing device, the second response confirming that the at least one suspended security domain of the mobile computing device secure element has been activated.

15. A computer program product, comprising:

a non-transitory computer-readable medium having computer-readable program instructions embodied therein that when executed by a computer cause the computer to suspend mobile functions, the computer-readable program instructions comprising:
- computer-readable program instructions to receive, by a central trusted service manager computing system, a first instruction to suspend a mobile wallet application associated with a mobile computing device secure element;
- computer-readable program instructions to process, by the central trusted service manager computing system, the first instruction by modifying a mobile wallet application state maintained by the central trusted service manager computing system to a suspended state;
- computer-readable program instructions to transmit, by the central trusted service manager computing system, a second instruction to a mobile computing device to suspend at least one security domain of the mobile computing device secure element that is associated with the suspended mobile wallet application; and
- computer-readable program instructions to receive, by the central trusted service manager computing system, a response from the mobile computing device, the response confirming that the at least one security domain of the mobile computing device secure element has been suspended.

16. The computer program product of claim 15, wherein the first instruction is received from a mobile network operator computing system associated with the mobile computing device.

17. The computer program product of claim 15, further comprising computer-readable program instructions to transmit a notification to one or more service provider computing systems that the at least one security domain of the mobile computing device secure element has been suspended.

18. The computer program product of claim 17, wherein the one or more service providers comprises an issuer computing system.

19. The computer program product of claim 15, wherein the mobile wallet application state comprises a state of the mobile wallet application associated with the mobile computing device secure element that identifies whether the mobile wallet application can conduct transactions.

20. The computer program product of claim 15, further comprising:
- computer-readable program instructions to receive, by a central trusted service manager computing system, a third instruction to reactivate the mobile wallet application associated with modify data stored on the mobile computing device secure element;
- computer-readable program instructions to process, by the central trusted service manager computing system, the third instruction by modifying the mobile wallet application state from a suspended state to an active state;
- computer-readable program instructions to transmit, by the central trusted service manager computing system, a fourth instruction to the mobile computing device to reactivate the at least one suspended security domain of the mobile computing device secure element; and
- computer-readable program instructions to receive, by the central trusted service manager computing system, a second response from the mobile computing device, the second response confirming that the at least one suspended security domain of the mobile computing device secure element has been activated.

* * * * *

UNITED STATES PATENT AND TRADEMARK OFFICE
CERTIFICATE OF CORRECTION

| | |
|---|---|
| PATENT NO. | : 9,544,759 B2 |
| APPLICATION NO. | : 14/183137 |
| DATED | : January 10, 2017 |
| INVENTOR(S) | : Michael J. Gargiulo |

Page 1 of 1

It is certified that error appears in the above-identified patent and that said Letters Patent is hereby corrected as shown below:

In the Claims

Column 21, Line 53 Claim 3 should read --"secure element has been suspended."--

Column 24, Line 25 Claim 20 should read --"application associated with the mobile"--

Signed and Sealed this
Ninth Day of May, 2017

Michelle K. Lee
*Director of the United States Patent and Trademark Office*